(12) United States Patent
Vian et al.

(10) Patent No.: US 9,198,363 B2
(45) Date of Patent: Dec. 1, 2015

(54) TREE METROLOGY SYSTEM

(71) Applicant: The Boeing Company, Chicago, IL (US)

(72) Inventors: John Lyle Vian, Renton, WA (US); Joshua Przybylko, Boston, MA (US)

(73) Assignee: THE BOEING COMPANY, Chicago, IL (US)

( * ) Notice: Subject to any disclaimer, the term of this patent is extended or adjusted under 35 U.S.C. 154(b) by 312 days.

(21) Appl. No.: 13/712,237

(22) Filed: Dec. 12, 2012

(65) Prior Publication Data

US 2014/0163781 A1    Jun. 12, 2014

(51) Int. Cl.

| G05D 1/00 | (2006.01) |
|---|---|
| A01G 23/00 | (2006.01) |
| G05D 1/10 | (2006.01) |
| G01S 17/02 | (2006.01) |
| G01S 17/88 | (2006.01) |
| G01S 17/89 | (2006.01) |
| G01S 7/48 | (2006.01) |

(52) U.S. Cl.
CPC ............. *A01G 23/00* (2013.01); *G01S 7/4802* (2013.01); *G01S 17/023* (2013.01); *G01S 17/88* (2013.01); *G01S 17/89* (2013.01); *G05D 1/104* (2013.01)

(58) Field of Classification Search
CPC ....... B64D 1/22; G06K 9/00771; G01C 11/02
USPC ............. 701/2, 3, 300, 514; 702/2, 155, 143; 382/173, 167, 110, 103; 340/870.02, 340/539.13
See application file for complete search history.

(56) References Cited

U.S. PATENT DOCUMENTS

| 5,581,250 | A | 12/1996 | Khvilivitzky |
| 6,792,684 | B1 | 9/2004 | Hyyppa |
| 7,187,452 | B2 | 3/2007 | Jupp et al. |
| 7,212,670 | B1 | 5/2007 | Rousselle et al. |
| 7,974,813 | B2 | 7/2011 | Welty et al. |
| 8,125,719 | B2 | 2/2012 | Aoi |
| 8,208,689 | B2 | 6/2012 | Savolainen et al. |
| 2004/0130702 | A1* | 7/2004 | Jupp et al. ............... 356/5.01 |
| 2007/0288132 | A1* | 12/2007 | Lam ........................ 701/23 |
| 2008/0147519 | A1* | 6/2008 | Reigel ..................... 705/28 |

(Continued)

FOREIGN PATENT DOCUMENTS

EP    2515147 A2    10/2012

OTHER PUBLICATIONS

L.O. Wallace et. al. "Assessing the Feasibility of UAV-Based Lidar for High Resolution Forest Change Detection", XXII ISPRS Congress, Aug. 25-Sep. 1, 2012, Melbourne, Australia; file name: Assessing the Feasibility 2012.pdf, whole document; Hereon: Wallace.*

(Continued)

*Primary Examiner* — Helal A Algahaim
*Assistant Examiner* — Jelani Smith
(74) *Attorney, Agent, or Firm* — Yee & Associates, P.C.

(57) ABSTRACT

A method and apparatus for identifying a number of diameters for a group of trees. An unmanned aerial vehicle moves on a route through the group of trees at a height that is configured to allow measurement of the number of diameters for the group of trees by a sensor system associated with the unmanned aerial vehicle. Information is generated about the number of diameters for the group of trees using the sensor system associated with the unmanned aerial vehicle.

20 Claims, 11 Drawing Sheets

(56) References Cited

U.S. PATENT DOCUMENTS

| | | |
|---|---|---|
| 2008/0260237 A1 | 10/2008 | Savolainen et al. |
| 2010/0250482 A1 | 9/2010 | Ma |
| 2013/0013204 A1* | 1/2013 | Kazama et al. ............... 701/533 |
| 2013/0211721 A1* | 8/2013 | Parisa ............................... 702/2 |

OTHER PUBLICATIONS

Stephane Ross et al., "Learning Monocular Reactive UAV Control in Cluttered Natural Environments", Nov. 7, 2012 file name: arxiv.org_pdf_1211.1690; whole document; Hereon: Ross.*

Kimon P. Valavanis, "Advances in Unmanned Aerial Vehicles", © 2007 Springer; this document was not cited in office action.*

Melander et al, "Implementation of Deconfliction in Multivehicle Autonomous Systems," 27th International Congress of the Aeronautical Sciences, Sep. 2010, pp. 1-16.

Valicka et al., "Cooperative Avoidance Control for UAVs," 10th International Conference on Control, Automation, Robotics and Vision, Dec. 2008, pp. 1462-1468.

Wallace et al., "Development of a UAV-LiDAR System with Application to Forest Inventory", Remote Sensing, May 2012, pp. 1519-1543.

Partial European Search Report, dated Sep. 25, 2015, regarding Application No. EP13196523.8, 5 pages.

* cited by examiner

TREE METROLOGY SYSTEM

BACKGROUND INFORMATION

1. Field

The present disclosure relates generally to metrology of forests and, in particular, to making measurements of a forest below the canopy of a forest. Still more particularly, the present disclosure relates to a method and apparatus for making measurements of trees using a sensor system.

2. Background

Forestry management is a branch of forestry that includes many different aspects. These aspects may include environmental, economic, administrative, legal, and social aspects of managing a forest. Forestry management may consist of various techniques such as timber extraction, planting trees, replanting trees, cutting roads and pathways through forests, preventing fires in a forest, maintaining the health of the forest, and other suitable activities.

When performing these and other operations with respect to forest management, a forest inventory may be performed to collect information about the forest that may be desired. A forest inventory is an identification of information about a forest for assessment or analysis.

For example, a forest inventory for the forest provides an ability to analyze the state of the forest as well as identify operations that may be performed. This information may be used to identify things such as types of trees, height of trees, age of trees, value of trees, and other suitable information about trees in the forest. For example, a number of trees per acre may be identified through forest inventory. Additionally, forest inventory also may be used to identify other information such as vegetation, wildlife, or both within a forest.

These operations that may be performed using a forest inventory may include, for example, at least one of replanting trees, harvesting trees, performing timber stand improvement activities such as pruning and treating trees, performing pest removal, generating warnings of potential fire conditions, and other suitable operations. As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C or item B and item C. In other examples, "at least one of" may be, for example, without limitation, two of item A, one of item B, and ten of item C; four of item B and seven of item C; and other suitable combinations.

One manner in which information may be obtained about a forest as part of a forest inventory is performing aerial surveys. Although the use of manned or unmanned aerial vehicles may provide information about the forest, this type of measurement of the forest may not provide as much information as desired. Aerial surveys are typically unable to generate information about the portion of the forest that is below the canopy. The canopy of the forest is the uppermost foliage in the forest. The canopy may be formed by the crowns of trees in the forest. Information such as tree height and tree counts may be made using aerial surveys. Other information, however, such as information about a tree diameter, tree taper, tree defects, and tree damage may not be measured as easily using aerial surveys.

Currently, personnel are sent into a forest to make measurements of the diameters of a tree as well as other measurements with respect to the portion of the trees below the canopy. Collecting information about all of the trees in the forest using personnel may be extremely expensive and prohibitive with respect to time and difficulty reaching trees on different types of terrain. As a result, measurements are made only for some of the trees to generate a sampling of trees in the forest. The diameters of other trees may be estimated by extrapolating from ground samples, or by using an empirical regression model with respect to age and tree height as measured from aerial surveys.

Sending personnel into the field to measure diameters of trees may be time consuming and costly. Estimating a tree diameter using tree height information may lead to inaccuracies. These inaccuracies may not provide a desired level of information to evaluate the quality in value of trees in a forest for harvesting purposes or maintenance purposes.

In some illustrative examples, a higher sampling of trees may be performed using a terrestrial survey performed from the ground using a terrestrial light detection and ranging system operated by a human operator. These types of systems are line of sight systems requiring a line of sight from the light detection and ranging system to the tree being measured. As a result, personnel are still required to enter the field and walk through a forest to make measurements. This type of measurement still requires considerable time and may be more expensive than desired to obtain a desired quality of information about the trees.

Therefore, it would be desirable to have a method and apparatus that takes into account at least some of the issues discussed above, as well as ether possible issues.

SUMMARY

In one illustrative embodiment, an apparatus comprises an unmanned aerial vehicle, a sensor system, and a controller. The sensor system is associated with the unmanned aerial vehicle and is configured to generate obstacle information and tree measurement information. The controller is configured to identify obstacles from the obstacle information generated by the sensor system as the unmanned aerial vehicle flies through a group of trees to generate the tree measurement information for the group of trees and control movement of the unmanned aerial vehicle to avoid the obstacles.

In another illustrative embodiment, a tree metrology system comprises an unmanned aerial vehicle, a camera system, a light detection and ranging system, and a controller. The camera system is associated with the unmanned aerial vehicle and is configured to generate images. The light detection and ranging system is associated with the unmanned aerial vehicle. The light detection and ranging system is configured to generate distance measurements from the unmanned aerial vehicle to points on a group of trees. The controller is configured to identify obstacles from the images generated by the camera system as the unmanned aerial vehicle flies through the group of trees to generate diameter information for the group of trees. The controller is further configured to control movement of the unmanned aerial vehicle through the group of trees to avoid the obstacles while the light detection and ranging system generates the diameter information.

In yet another illustrative embodiment, a method for identifying a number of diameters for a group of trees is provided. An unmanned aerial vehicle moves on a route through the group of trees at a height that is configured to allow measurement of the number of diameters for the group of trees by a sensor system associated with the unmanned aerial vehicle. Information is generated about the number of diameters for the group of trees using the sensor system associated with the unmanned aerial vehicle.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that an unmanned aerial vehicle may be used to fly through the trees below the canopy to perform a survey to identify diameters of trees. The illustrative embodiments also recognize and take into account that many of the light detection and ranging systems used for both aerial surveys and terrestrial surveys may be heavier than desired for use in an unmanned aerial vehicle that may be used to fly between trees as opposed to above the canopy of trees. The illustrative embodiments recognize and take into account that the size and weight of the light detection and ranging system may be reduced in a manner that still allows for a desired level of quality in the information generated about the trees.

In one illustrative example, an apparatus comprises an unmanned aerial vehicle, a sensor system, and a controller. The sensor system is associated with the unmanned aerial vehicle. The sensor system is configured to generate obstacle information and tree measurement information. The controller is configured to identify obstacles from the obstacle information generated by the sensor system as the unmanned aerial vehicle flies at a level relative to a group of trees to generate the diameter information for the group of trees and control movement of the unmanned aerial vehicle to avoid the obstacles.

In these illustrative examples, the size of the sensor system may be reduced through the manner in which diameter information about the trees is generated.

Figure 1:
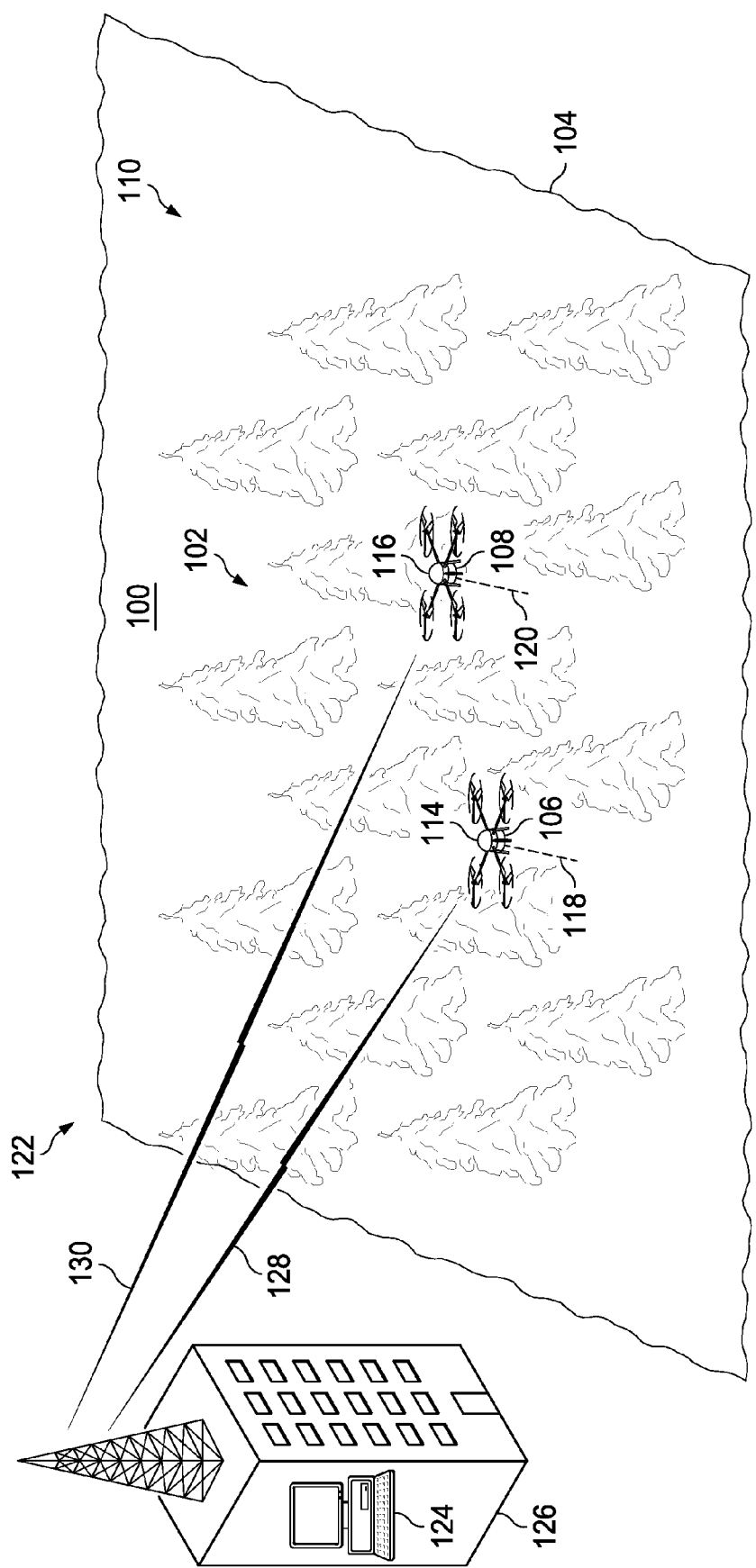
FIG. 1 is an illustration of a tree metrology environment in accordance with an illustrative embodiment.

Turning now to FIG. 1, an illustration of a tree metrology environment is depicted in accordance with an illustrative embodiment. In this illustrative example, tree metrology environment 100 includes group of trees 104. Tree metrology system 122 may be used to perform measurements of group of trees 104. In this depicted example, tree metrology system 122 includes unmanned aerial vehicles 102 and measurement controller 124.

As depicted, unmanned aerial vehicles 102 are configured to fly through group of trees 104 to generate information about one or more trees in group of trees 104. As used herein, a "group of" when used with reference to items means one or more items. For example, group of trees 104 is one or more trees.

In this example, unmanned aerial vehicles 102 include unmanned aerial vehicle 106 and unmanned aerial vehicle 108. In this particular example, unmanned aerial vehicles 102 are configured to perform tree metrology. In other words, unmanned aerial vehicles 102 may be configured to make measurements of group of trees 104 as unmanned aerial vehicles 102 fly through group of trees 104 below the canopy of group of trees 104.

In these illustrative examples, unmanned aerial vehicle 106 includes sensor system 114 and unmanned aerial vehicle 108 includes and sensor system 116.

As depicted, sensor system 114 is configured to scan trees 110 with laser beam 118. Responses to the sweeping of laser beam 118 are detected by sensor system 114. Additionally, sensor system 114 also is configured to generate images. The responses detected from laser beam 118 and the images may be used to generate a measurement of diameters of trees 110 in an illustrative example. Further, other measurements such as tree taper may also be generated using at least one of the images and responses detected from laser beam 118.

In a similar fashion, sensor system 116 is configured to generate information about trees 110 in group of trees 104 with laser beam 120. Laser beam 120 may scan trees 110 as unmanned aerial vehicle 108 flies through trees 110 in group of trees 104. Responses to laser beam 120 may be detected by sensor system 116. Further, sensor system 116 also is configured to generate images of trees 110. The responses to laser beam 120 and the images may be used to generate measurements of diameters of trees 110.

Further, sensor system 114 in unmanned aerial vehicle 106 and sensor system 116 in unmanned aerial vehicle 108 may be used to generate information for avoiding obstacles while flying through group of trees 104. In particular, the obstacles may include group of trees 104 as well as possibly other types of obstacles. Other obstacles may include, for example, buildings, light poles, tree harvesting equipment, and other types of objects. At least one of the images and the responses to the laser beams may be used to direct unmanned aerial vehicles 102 along trajectories through group of trees 104 that avoid obstacles.

In these illustrative examples, the information generated may be processed by unmanned aerial vehicles 102 to generate diameter information about group of trees 104. This information may then be sent to measurement controller 124 located in control station 126. In this illustrative example, the diameter information may be sent by unmanned aerial vehicle 106 over wireless communications link 128 and by unmanned aerial vehicle 108 over wireless communications link 130 to control station 126.

In some illustrative examples, the responses and images may be the diameter information sent to measurement controller 124 in control station 126. Measurement controller 124 may then use this diameter information to generate a number of diameters for group of trees 104.

Further, sensor system 114 in unmanned aerial vehicle 106 and sensor system 116 in unmanned aerial vehicle 108 may be used to generate other types of information in addition to or in place of the diameter information for group of trees 104. This information may be referred to collectively as tree measurement information.

Figure 2:
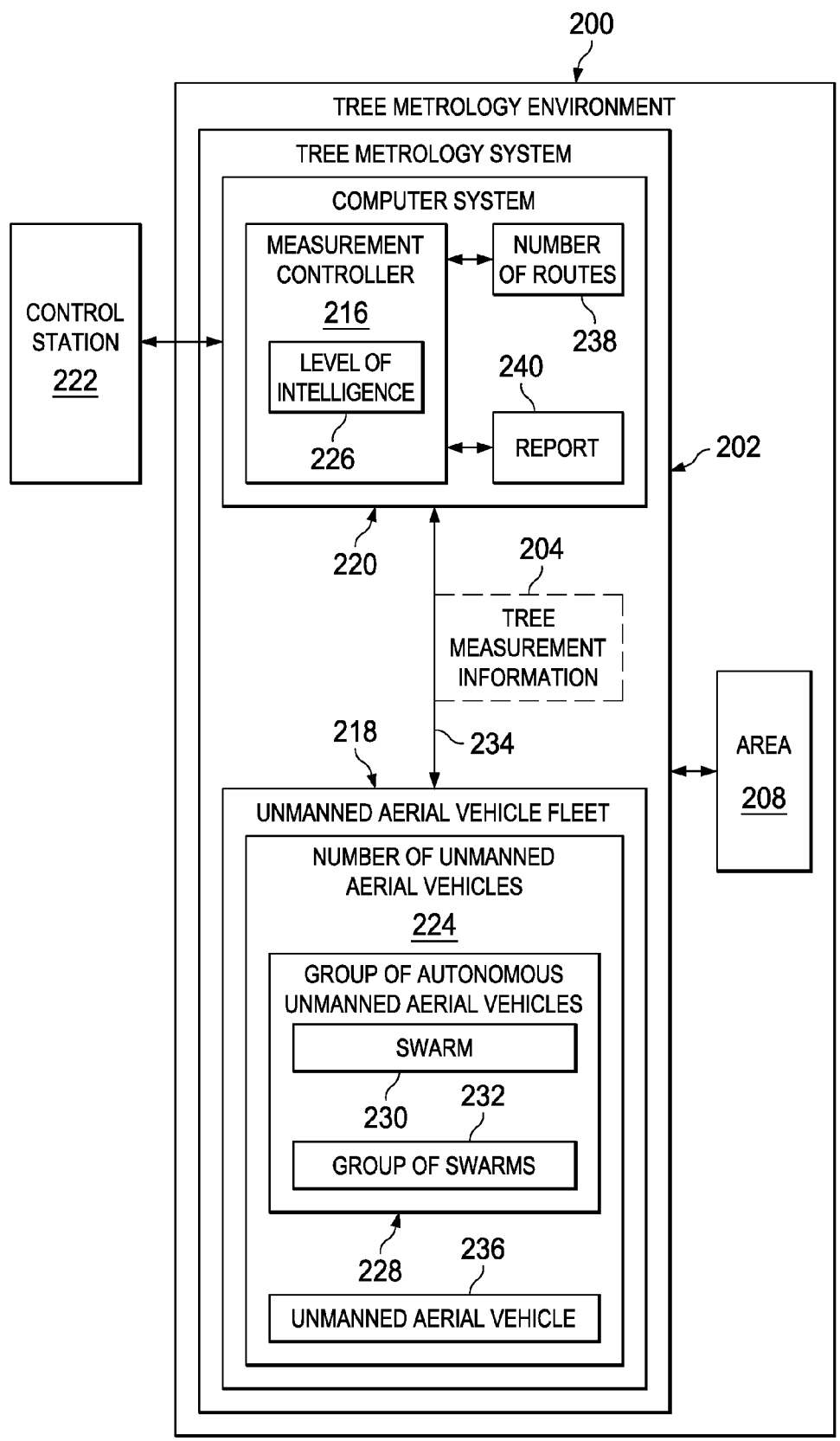
FIG. 2 is an illustration of a block diagram of a tree metrology environment in accordance with an illustrative embodiment.

With reference now to FIG. 2, an illustration of a block diagram of a tree metrology environment is depicted in accordance with an illustrative embodiment. In this illustrative example, tree metrology environment 100 in FIG. 1 is an example of one implementation for tree metrology environment 200 in FIG. 2. In this illustrative example, tree metrology system 202 is used to generate tree measurement information 204 about group of trees 206.

In these illustrative examples, group of trees 206 may take various forms. For example, group of trees 206 may be a group of trees found in a location such as a natural forest, an artificially regenerated forest, a tree farm, an apple orchard, a pine tree plantation, a park, a mountain, or some other suitable location in which one or more trees are present.

Group of trees 206 may be located in any location in which trees in group of trees 206 have spacing such that one or more unmanned aerial vehicles in unmanned aerial vehicle fleet 218 may maneuver through group of trees 206. The spacing may have a pattern. This pattern may be trees arranged in rows and columns. The spacing may have other regular patterns that do not rely on rows of trees. In yet other illustrative examples, the space may be random or irregular.

In these illustrative examples, tree measurement information 204 is generated about group of trees 206. Tree measurement information 204 may be used to perform an analysis of group of trees 206. This analysis may be used to perform various actions on group of trees 206. For example, pruning, tree harvesting, tree planting, pest elimination, and other suitable actions may be performed based on the analysis of tree measurement information 204.

In these illustrative examples, tree metrology system 202 comprises measurement controller 216 and unmanned aerial vehicle fleet 218. Measurement controller 216 is configured to perform at least one of controlling the operation of unmanned aerial vehicle fleet 218, processing tree measurement information 204, and other suitable operations.

As depicted, measurement controller 216 may be implemented using hardware, software, or a combination of the two. In the illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being. For example, the processes may be implemented as circuits in organic semiconductors.

In this illustrative example, measurement controller 216 may be implemented in computer system 220. Computer system 220 includes one or more computers. When more than one computer is present in computer system 220, those computers may be in communication with each other over a communications medium such as a network.

In these illustrative examples, measurement controller 216 in computer system 220 may be in a single location such as control station 222. Control station 222 may be located in a building on the ground, an aircraft, a ship, a ground vehicle, or in some other suitable location.

In these illustrative examples, measurement controller 216 may control unmanned aerial vehicle fleet 218 to move through group of trees 206. This movement may be controlled to generate tree measurement information 204 for some or all of group of trees 206. For example, measurement controller 216 may generate number of routes 238 for use by unmanned aerial vehicle fleet 218 to fly through group of trees 206.

Additionally, measurement controller 216 also may receive tree measurement information 204 and process tree measurement information 204. In these illustrative examples, the processing of tree measurement information 204 may be used to generate report 240. Report 240 may include diameters, taper information, tree density, tree type, tree spacing, and other suitable information for group of trees 206. Report 240 may take a number of different forms. For example, report 240 may include charts, graphics, text, images, and other suitable types of information.

Additionally, report 240 also may include recommendations. These recommendations may include whether additional planting of trees is needed, whether trees should be thinned out, whether harvesting of trees should occur, and other suitable types of recommendations.

As depicted, measurement controller 216 has level of intelligence 226. In some illustrative examples, level of intelligence 226 may be such that input from a human operator may be unnecessary. For example, an artificial intelligence system and other suitable types of processors may provide a desired level of intelligence for level of intelligence 226 in measurement controller 216. In particular, the artificial intelligence system may include an expert system, a neural network, simple heuristics, fuzzy logic, Bayesian networks, or some other suitable type of system that provides a desired level of intelligence for level of intelligence 226 in measurement controller 216.

In this illustrative example, unmanned aerial vehicle fleet 218 includes number of unmanned aerial vehicles 224. As used herein, a "number of" when used with reference to items means one or more items. For example, number of unmanned aerial vehicles 224 is one or more unmanned aerial vehicles.

As depicted, number of unmanned aerial vehicles 224 may be or may include group of autonomous unmanned aerial vehicles 228. In this illustrative example, group of autonomous unmanned aerial vehicles 228 may be configured to operate as swarm 230 or group of swarms 232 in these illustrative examples.

In other illustrative examples, measurement controller 216 may even be distributed in different locations. For example, measurement controller 216 may be distributed in one or more of number of unmanned aerial vehicles 224 in unmanned aerial vehicle fleet 218. In still other illustrative examples, measurement controller 216 may be distributed in number of unmanned aerial vehicles 224 and control station 222, depending on the particular implementation. In some illustrative examples, measurement controller 216 may be a computer program that receives input from a human operator and provides output to the human operator.

In these illustrative examples, one or more of number of unmanned aerial vehicles 224 in unmanned aerial vehicle fleet 218 are configured to generate tree measurement information 204. Tree measurement information 204 may be sent to measurement controller 216 over communications link 234. In these illustrative examples, tree measurement information 204 is sent to measurement controller 216 over communications link 234. When measurement controller 216 is in a remote location to unmanned aerial vehicle fleet 218, such as in control station 222, communications link 234 may be a wireless communications link. Tree measurement information 204 may be sent periodically or may be sent in substantially real time as tree measurement information 204 is being generated by unmanned aerial vehicle 236 in unmanned aerial vehicles 224.

In another illustrative example, communications link 234 may be a wired communications link that is established when unmanned aerial vehicle 236 has completed making measurements to generate tree measurement information 204. In this case, unmanned aerial vehicle 236 may return to control station 222. Communications link 234 may be a network cable, a wireless communications link, a universal serial bus cable, an optical cable, or some other suitable medium for establishing communications link 234. In these illustrative examples, measurement controller 216 is configured to receive tree measurement information 204 from one or more unmanned aerial vehicles in unmanned aerial vehicles 224 in unmanned aerial vehicle fleet 218. In this illustrative example, measurement controller 216 may receive tree measurement information 204 from unmanned aerial vehicle 236.

Figure 3:
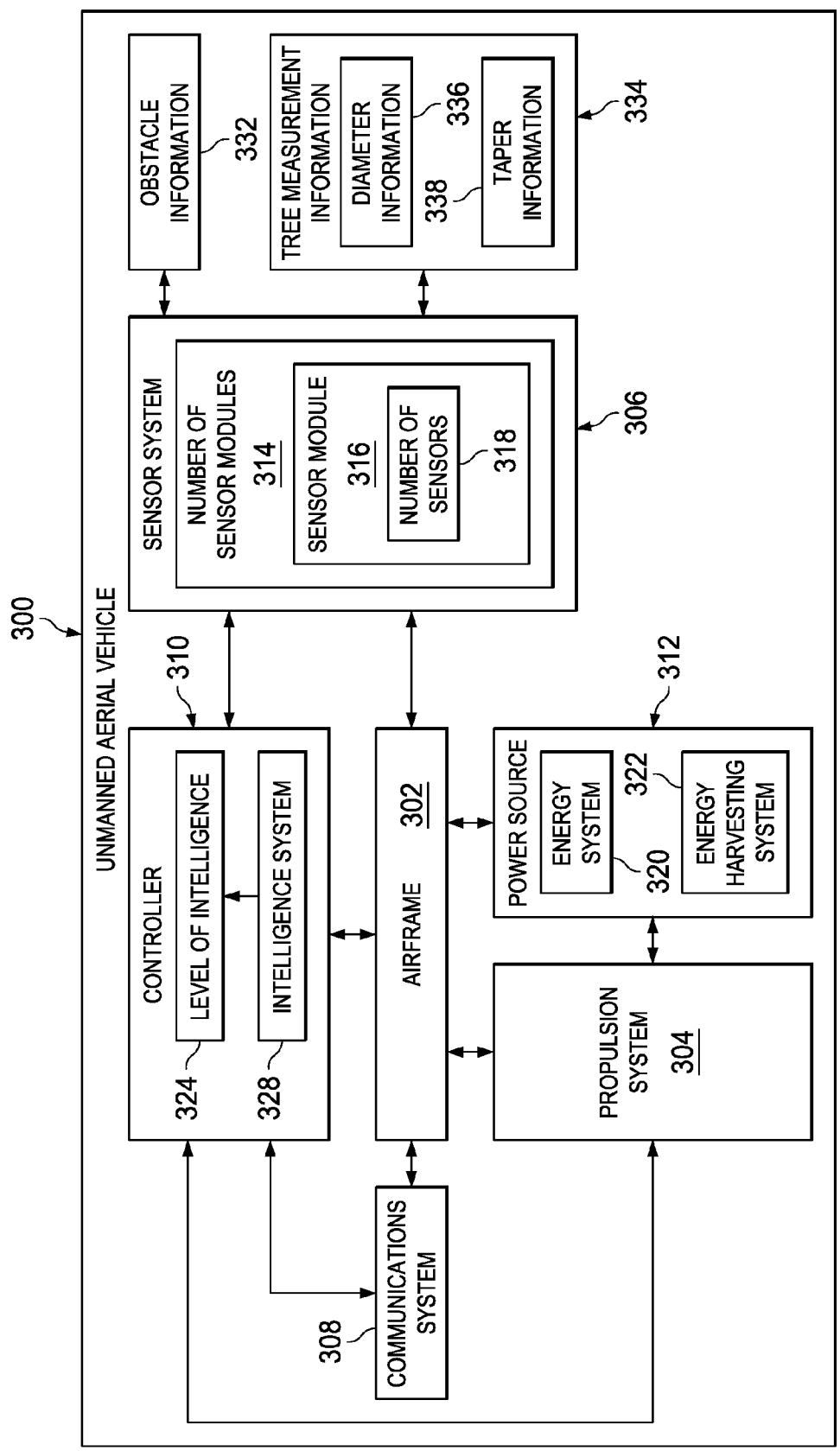
FIG. 3 is an illustration of a block diagram of an unmanned aerial vehicle in accordance with an illustrative embodiment.

Turning now to FIG. 3, an illustration of a block diagram of an unmanned aerial vehicle is depicted in accordance with an illustrative embodiment. In this depicted example, unmanned aerial vehicle 300 is an example of one implementation for an unmanned aerial vehicle in number of unmanned aerial vehicles 224 in unmanned aerial vehicle fleet 218 in FIG. 2. Unmanned aerial vehicle 300 may be used to implement unmanned aerial vehicle 106 and unmanned aerial vehicle 108 in FIG. 1.

In this illustrative example, unmanned aerial vehicle 300 includes a number of different components. For example, unmanned aerial vehicle 300 includes airframe 302, propulsion system 304, sensor system 306, communications system 308, controller 310, and power source 312.

Airframe 302 provides a structure for physical support of the other components in unmanned aerial vehicle 300. Airframe 302 may be a fuselage, wings, stabilizers and other structures suitable for these types of structures. Airframe 302 may also include control surfaces such as ailerons, rudders, elevators, or other types of control surfaces.

Propulsion system 304 is associated with airframe 302 and is configured to provide movement for unmanned aerial vehicle 300. When one component is "associated" with another component, the association is a physical association in these depicted examples.

For example, a first component, propulsion system 304, may be considered to be associated with a second component, airframe 302, by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

Propulsion system 304 may take various forms. For example, propulsion system 304 may include at least one of a number of engines and a number of propellers. The number of engines may be electric engines such as brushless motors. The number of engines may also use a fuel base such as kerosene. In yet other examples, propulsion system 304 may be a jet engine, a turbojet, or some other suitable type of propulsion system for moving unmanned aerial vehicle 300.

Sensor system 306 is a system associated with airframe 302. Sensor system 306 is configured to generate information about the environment around unmanned aerial vehicle 300. Sensor system 306 may include one or more different types of sensors configured to generate information about the environment around unmanned aerial vehicle 300. For example, sensor system 306 may generate at least one of obstacle information 332 and tree measurement information 204 in FIG. 2. In these illustrative examples, sensor system 306 may be implemented using many different types of sensors. For example, sensor system 306 may be implemented using at least one of a light-based active sensor system, a light detection and ranging system, a camera system, a laser altimeter, a time-of-flight camera system, an all-focus image camera, a stereographic camera, and other suitable types of sensors.

Obstacle information 332 may include identifications of obstacles, distances to obstacles, locations of obstacles, and other suitable types of information. The obstacles may be trees, tree branches, walls, vines, man-made structures, vehicles, and other suitable types of objects that may be a potential hazard to the movement of unmanned aerial vehicle 300.

In these illustrative examples, tree measurement information 334 is an example of tree measurement information 204 in FIG. 2. In this illustrative example, tree measurement information 204 in this example includes at least one of diameter information 336, taper information 338, and other suitable types of information for group of trees 206 in area 208.

In these illustrative examples, diameter information 336 comprises diameters that are measured for group of trees 206. Taper information 338 indicates a taper in the diameter of group of trees 206. In other illustrative examples, tree measurement information 204 may be used to indicate diameter at breast height, number of stems, the presence of forks, crown/root membership, other irregularities in tree size, decay classification, other damage, the condition of the soil underneath the tree, fire damage, or other suitable types of information. The information in some illustrative examples may be any information that affects the value of group of trees 206. With these types of information, a decision can be made as to whether the size of trees, health of trees, or both size and health of trees should result in other operations being performed on group of trees 206 in area 208. Of course, other suitable types of information also may be measured depending on the particular implementation.

In these illustrative examples, sensor system 306 may include or may comprise number of sensor modules 314. In this example, a sensor module in number of sensor modules 314 is removable. In other words, one sensor module may be swapped out for another sensor module in number of sensor modules 314 in sensor system 306 in unmanned aerial vehicle 300.

In this manner, creator versatility may be provided for unmanned aerial vehicle 300. In particular, a sensor module in number of sensor modules 314 may be selected for use by unmanned aerial vehicle 300 depending on the mission or task assigned to unmanned aerial vehicle 300. Further, with the use of number of sensor modules 314, the weight of unmanned aerial vehicle 300 may be reduced by reducing the number of sensors in sensor system 306 only to those needed for a particular mission or task.

For example, sensor module 316 may be comprised of number of sensors 318. The composition of number of sensors 318 may be selected for the particular type of mission or task to be performed.

Communications system 308 is associated with airframe 302. As depicted, communications system 308 is configured to provide communications between unmanned aerial vehicle 300 and another device. The other device may be, for example, measurement controller 216, number of unmanned aerial vehicles 224 in unmanned aerial vehicle fleet 218, a navigation controller, and other suitable components shown in FIG. 2. The communications may be wireless communications in these illustrative examples. In some cases, a wired communications interface may also be present.

With communication to a navigation controller, unmanned aerial vehicle 300 may use communications system 308 to wirelessly send information to the navigation controller such that the navigation controller processes the raw information and wirelessly returns processed location and navigation information to unmanned aerial vehicle 300. Communications system 308 may be configured such that information is communicated to other devices for processing off-board from unmanned aerial vehicle 300. In this case, the weight of unmanned aerial vehicle 300 may be reduced by reducing the weight of the on-board information processing equipment, reducing power requirements for on-board information processing using the processing equipment, or some combination thereof.

Power source 312 is associated with airframe 302. Power source 312 is configured to provide power for the other components in unmanned aerial vehicle 300. Power source 312 may take a number of different forms. For example, power source 312 may include at least one of energy system 320 and energy harvesting system 322.

In this illustrative example, energy system 320 may include one or more batteries. These batteries may be modular and replaceable. In other illustrative examples, energy system 320 may be at least one of a fuel cell, fuel in a fuel tank, and some other suitable type of energy system.

Energy harvesting system 322 is configured to generate power for components in unmanned aerial vehicle 300 from the environment around unmanned aerial vehicle 300. For example, energy harvesting system 322 may include at least one of a solar cell, a micro wind turbine generator, and other suitable types of energy harvesting systems that generate power from the environment around unmanned aerial vehicle 300.

In this illustrative example, controller 310 is associated with airframe 302. As depicted, controller 310 takes the form of hardware and may include software.

Controller 310 is configured to control the operation of unmanned aerial vehicle 300. Controller 310 may provide level of intelligence 324. Level of intelligence 324 may vary depending on the particular implementation of unmanned aerial vehicle 300. In some illustrative examples, controller 310 may be considered part of measurement controller 216 in FIG. 2.

In some cases, level of intelligence 324 may be such that controller 310 receives specific commands. These commands may include, for example, without limitation, a direction of travel, a waypoint, when to generate tree measurement information 204 in FIG. 2 using sensor system 306, and other similar commands.

In other illustrative examples, level of intelligence 324 may be higher such that unmanned aerial vehicle 300 may receive a task. In these illustrative examples, a task is a piece of work that is performed. The task may be part of a mission. In these examples, a task may be comprised of operations that are performed for the piece of work. For example, a task may be to scan a particular location in group of trees 206 in FIG. 2. Another task may be to travel to the particular location in group of trees 206.

Controller 310 may identify operations for performing the task. This task may be a fixed task in which unmanned aerial vehicle 300 follows a path in a particular area to generate tree measurement information 204 using sensor system 306.

In other illustrative examples, level of intelligence 324 may be even higher such that unmanned aerial vehicle 300 is configured to communicate with other unmanned aerial vehicles to coordinate performing one or more tasks. For example, controller 310 may include a circuit, a computer program, an artificial intelligence system, and other suitable types of processes that may provide a desired level for level of intelligence 324.

In these illustrative examples, intelligence system 328 may provide level of intelligence 324. Intelligence system 328 may use an expert system, a neural network, fuzzy logic, or some other suitable type of system to provide level of intelligence 324.

Level of intelligence 324 in controller 310 may allow for functions such as dynamic route planning. In this manner, obstacles may be identified along a route and may therefore be avoided. This identification and avoidance of obstacles may be performed in real time. These obstacles may include, for example, without limitation, another unmanned aerial vehicle, a mountain side, a tree, and other obstacles. The avoidance of obstacles may be performed using obstacle information 332 generated by sensor system 306.

Controller 310 also may monitor the health of different systems in unmanned aerial vehicle 300. For example, controller 310 may monitor a level of energy being provided or remaining in power source 312. If power source 312 only includes batteries in energy system 320, controller 310 may direct unmanned aerial vehicle 300 to return to base for the recharging or exchange of batteries.

In these illustrative examples, the type of unmanned aerial vehicle used for unmanned aerial vehicle 300 may be selected based upon its payload, sensor capabilities, obstacles present in group of trees 206, flight parameters, available resources, or a combination thereof. An obstacle avoidance and navigation algorithm may be configured to use obstacle information 332 to avoid obstacles or select the type of unmanned aerial vehicle with a desired level of performance for the type of trees in group of trees 206 and/or the obstacles present in group of trees 206.

As an example, in a natural forest without consistent spacing between trees, a smaller unmanned aerial vehicle may be selected. In other illustrative examples, when unmanned aerial vehicle 300 is used with swarm 230 of group of autonomous unmanned aerial vehicles 228, level of intelligence 324 of controller 310 may be such that controller 310 directs the smallest unmanned aerial vehicle in swarm 230 to the area of group of trees 206 with the least amount of space between trees while directing the larger unmanned aerial vehicles in swarm 230 to other areas of group of trees 206. In this manner, unmanned aerial vehicles of different sizes in swarm 230 may work together to generate information about group of trees 206.

The illustration of unmanned aerial vehicle 300 in FIG. 3 is not meant to imply limitations to the manner in which unmanned aerial vehicle 300 may be implemented. In other illustrative examples, unmanned aerial vehicle 300 may include other components in addition to or in place of the ones depicted.

Figure 4:
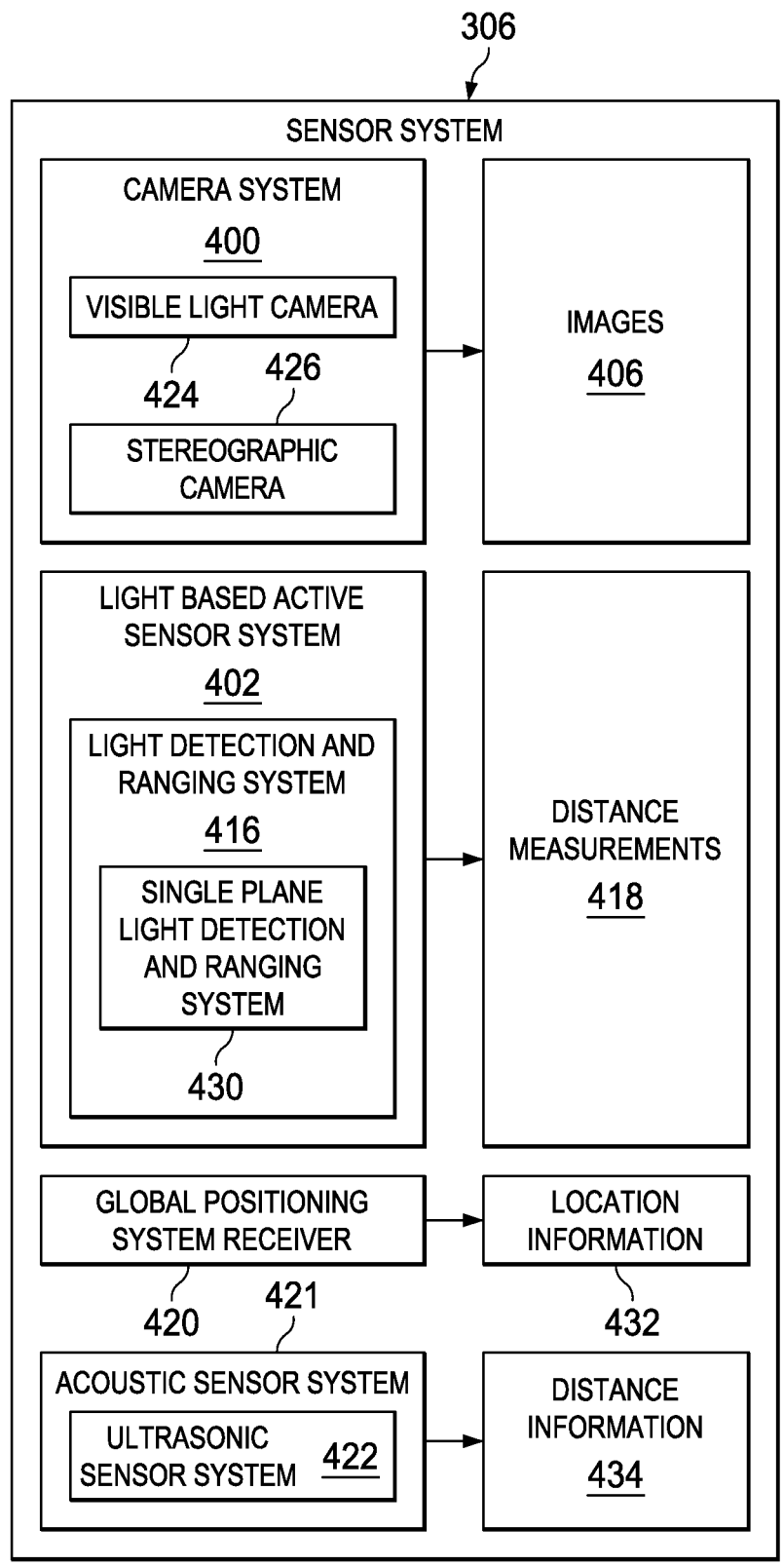
FIG. 4 is an illustration of a block diagram of sensors in a sensor system for an unmanned aerial vehicle in accordance with an illustrative embodiment.

Turning now to FIG. 4, an illustration of a block diagram of sensors in a sensor system for an unmanned aerial vehicle is depicted in accordance with an illustrative embodiment. In this figure, examples of sensors that may be implemented in sensor system 306 for unmanned aerial vehicle 300 is shown. As depicted, sensor system 306 comprises camera system 400 and light-based active sensor system 402.

As depicted, camera system 400 comprises visible light camera 424. In some illustrative examples, camera system 400 may take other forms, selected from one of a multispectral camera, a hyperspectral camera, a time-of-flight camera, or some other suitable type of camera. In yet other examples, camera system 400 may comprise a multiple camera array.

In this illustrative example, camera system 400 is configured to generate a number of images 406 with a desired resolution. Images 406 may be still images, video images, images with depth information, or some other suitable type of images. In this illustrative example, images 406 may be used as obstacle information 332, and tree measurement information 334. In other words, images 406 may be used both for generating information to avoid obstacles and information about trees.

In this illustrative example, light-based active sensor system 402 takes the form of light detection and ranging system 416. In this illustrative example, light detection and ranging system 416 generates distance measurements 418 to different points on objects. These points may be points on trees.

Light detection and ranging system 416 transmits light and receives responses to the light to generate distance measurements 418. In particular, the light may take the form of a laser beam in these illustrative examples.

With distance measurements 418, a three-dimensional location may be generated for those points for use in a point cloud or for other suitable purposes. In this illustrative example, distance measurements 418 to different points may be used with pixels in images 406 to identify the diameter or taper of trees in the group of trees. The diameter may be calculated using a nonlinear function that translates pixel width to true width based on distance. Alternatively, the diameter of the trees may be calculated using conversion tables that show the conversion between pixel width and true width as a function of distance to an object.

In this manner, distance measurements 418 also may be used for both obstacle information 332 and tree measurement information 334. With the combination of images 406 and distance measurements 418, information such as diameter information 336 may be generated for tree measurement information 334. Multiple diameters at different levels may be identified to form taper information 338 in FIG. 3.

Further, with images 406, unmanned aerial vehicle 300 may navigate between trees and avoid encountering trees as well as other obstacles. Further, distance measurements 418, when correlated to images 406, also may provide an ability to determine whether unmanned aerial vehicle 300 may fit between obstacles, such as trees.

In these illustrative examples, light detection and ranging system 416 may be single plane light detection and ranging system 430. In other words, the laser or other light may only sweep about a plane defined by two axes rather than through multiple planes defined by three axes. Measurements for different levels may be made by adjusting the height of unmanned aerial vehicle 300 in these illustrative examples.

With this type of light detection and ranging system, the weight of sensor system 306 may be reduced because of the reduced complexity of this type of light detection and ranging system. Further, single plane light detection and ranging system 430 also may be a low frequency light detection and ranging system in these illustrative examples. A low frequency light detection and ranging system may scan at a rate of about 10 Hz to 40 Hz. A low frequency light detection and ranging system may be used to reduce weight and consume less power than larger light detection and ranging systems. As a result, a smaller unmanned aerial vehicle may be used for unmanned aerial vehicle 300 and thus, unmanned aerial vehicle 300 may more easily navigate through a group of trees in these illustrative examples.

In another illustrative example, single plane light detection and ranging system 430 may be a high frequency light detection and ranging system. A high frequency light detection and ranging system may be used when unmanned aerial vehicle 300 is a heavier aircraft. In these illustrative examples, a high frequency light detection and ranging system may have a scan rate of about 40 Hz to 100 KHz. With the use of a high frequency light detection and ranging system, more power is needed to operate the system on unmanned aerial vehicle 300.

In another illustrative example, camera system 400 may comprise stereographic camera 426. With this type of implementation, light-based active sensor system 402 may be omitted from sensor system 306. Images 406 generated by stereographic camera 426 may be used for both obstacle information 332 and tree measurement information 334 in these illustrative examples.

Stereographic camera 426 is configured to generate images that may be used to form three-dimensional images and identify depth and locations of points in the image. In other words, stereographic camera 426 may generate images 406 in a manner that allows for the identification of tree measurement information 334 without using light-based active sensor system 402. In other illustrative examples, sensor system 306 may include a laser altimeter or other suitable components, depending on the particular implementation.

In other illustrative examples, camera system 400 may be a time-of-flight camera system. When camera system 400 is a time-of-flight camera system, camera system 400 may capture depth information within images 406 of the entire scene with each laser or light pulse as opposed to point-by-point scanning with a laser beam as employed with a light detection and ranging system. In still other illustrative examples, camera system 400 may be an all-focus image camera or other suitable types of imaging systems that have a desired weight and produce a desired level of granularity in images 406.

In these illustrative examples, global positioning system receiver 420 is an example of another sensor that may be optionally included in sensor system 306. Global positioning system receiver 420 generates location information 432, identifying a location of unmanned aerial vehicle 300 in three dimensions. For example, global positioning system receiver 420 may generate information such as a latitude, longitude, and altitude for unmanned aerial vehicle 300.

In some illustrative examples, global positioning system receiver 420 may be omitted or may not function as desired under a canopy of a group of trees. In this case, the canopy attenuates or eliminates the global positioning signal. As a result, a process called simultaneous location and mapping may be used by unmanned aerial vehicle 300.

With simultaneous location and mapping, position information from a global positioning system receiver is combined with location information from a simultaneous location and mapping system. This simultaneous location and mapping system may combine sensor information from visible light camera 424, stereographic camera 426, light detection and ranging system 416, and/or other sensor information from other sensors in unmanned aerial vehicle 300 to maintain position estimates or improve global positioning information.

In these illustrative examples, sensors in acoustic sensor system 421 may be placed in different orientations on unmanned aerial vehicle 300. As depicted, acoustic sensor system 421 may be implemented using ultrasonic sensor system 422. Of course, any other type of sound based system may be used. Ultrasonic sensor system 422 may provide height information about the height of unmanned aerial vehicle 300. Further, ultrasonic sensor system 422 also may generate distance information 434. Distance information 434 identifies a distance from unmanned aerial vehicle 300 to trees and other obstacles for purposes of maneuvering unmanned aerial vehicle 300.

Although particular examples have been described, sensor system 306 may include any combination of these sensors to generate tree measurement information 334 and obstacle information 332.

Examples of combinations of sensors that may be used in sensor system 306 include visible light camera 424 and light detection and ranging system 416. In another illustrative example, light detection and ranging system 416 may be used by itself. In still another example, sensor system 306 may only include stereographic camera 426. Of course, these combinations are only examples and other implementations may include other combinations of the sensors illustrated for sensor system 306 in FIG. 4 as well as other suitable types of sensors that may be suitable for generating at least one of tree measurement information 334 and obstacle information 332. For example, although the illustrative embodiments are shown with both light detection and ranging system 416 and ultrasonic sensor system 422 included in sensor system 306, only one of light detection and ranging system 416 and ultrasonic sensor system 422 may be needed to generate tree measurement information 334 and obstacle information 332 in these illustrative examples.

The illustration of tree metrology environment 200 and the different components in tree metrology system 202 in FIGS. 2-4 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in some illustrative examples, different types of unmanned aerial vehicles may be used to generate tree measurement information 204. For example, both fixed wing unmanned aerial vehicle and an unmanned rotorcraft may be used by unmanned aerial vehicle fleet 218 to generate tree measurement information 204 for group of trees 206. In still other illustrative examples, tree measurement information 204 also may include other types of information such as type of trees, height of trees, and other suitable types of information about group of trees 206.

In some illustrative examples, measurement controller 216 may not be used to generate number of routes 238. Instead, an operator may point unmanned aerial vehicle 236 in the direction between trees. Unmanned aerial vehicle 236 may then travel in that direction to generate measurements while avoiding obstacles.

Figure 5:
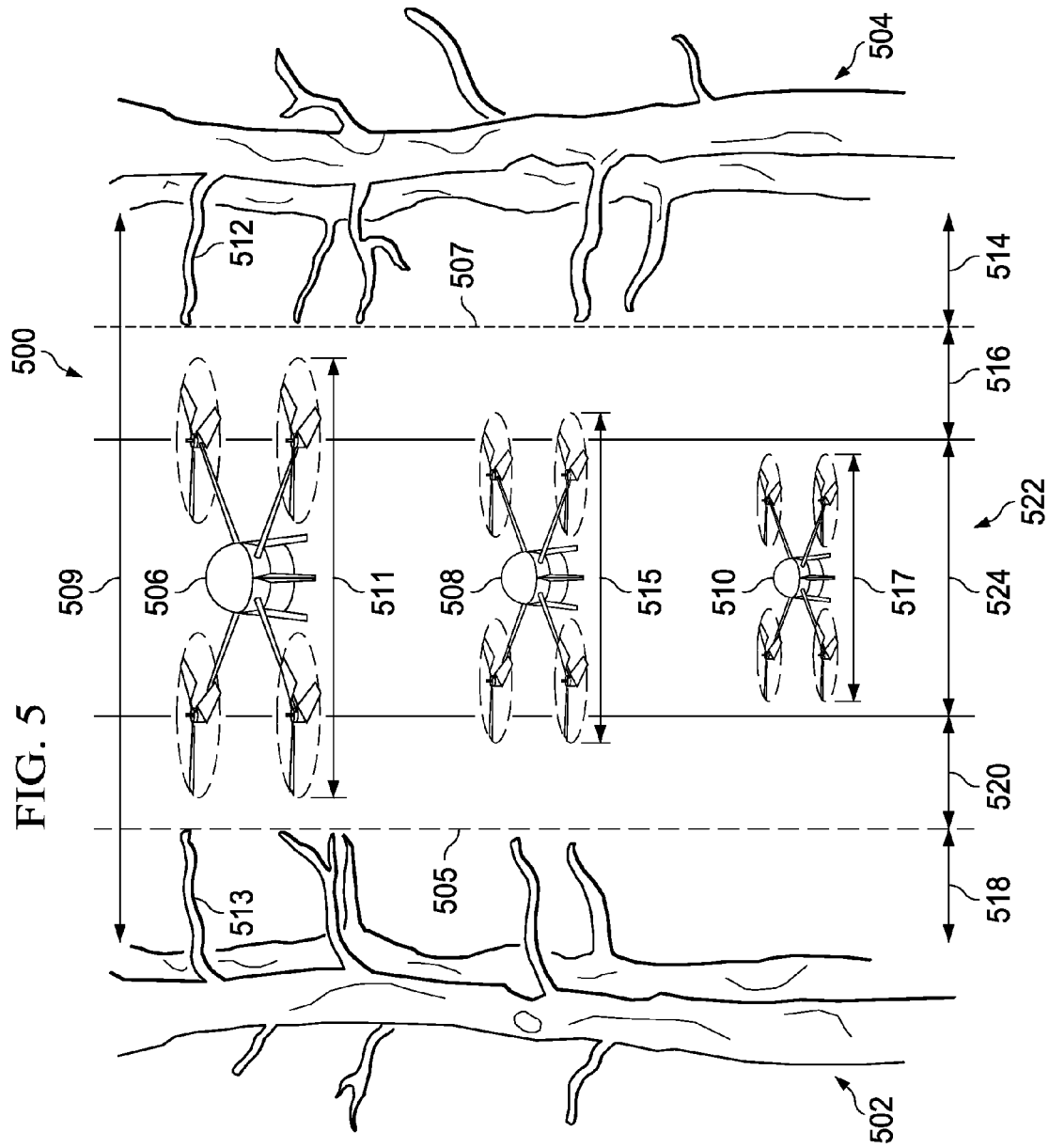
FIG. 5 is an illustration of different sizes of unmanned aerial vehicles in accordance with an illustrative embodiment.

With reference now to FIG. 5, an illustration of different sizes of unmanned aerial vehicles are depicted in accordance with an illustrative embodiment. In this illustrative example, group of trees 500 is another example of an implementation of group of trees 206 shown in block form in FIG. 2.

Group of trees 500 has row 502 and row 504. This arrangement of group of trees 500 may be found in an environment such as a tree farm. Specifically, row 502 and row 504 may be part of a pine tree plantation in these illustrative examples.

As depicted, rotorcraft 506, rotorcraft 508, and rotorcraft 510 are shown between row 502 and row 504 in group of trees 500. These rotorcrafts are drawn to scale in these illustrative examples.

Rotorcraft 506, rotorcraft 508, and rotorcraft 510 are examples of implementations for unmanned aerial vehicle 300 in FIG. 3 and for an implementation of an unmanned aerial vehicle in unmanned aerial vehicle fleet 218 in FIG. 2. Specifically, rotorcraft 506, rotorcraft 508, and rotorcraft 510 are examples of different sizes that may be selected for unmanned aerial vehicle 300.

Rotorcraft 506, rotorcraft 508, and rotorcraft 510 may be different sizes in these illustrative examples. The type of rotorcraft used for unmanned aerial vehicle 300 may depend on the parameters of group of trees 500 in row 502 and row 504. For example, if group of trees 500 in row 502 and row 504 are pruned trees, a larger rotorcraft may be used. In other illustrative examples, if group of trees 500 in row 502 and row 504 are unpruned trees, a smaller rotorcraft may be used.

In these illustrative examples, size of the rotorcraft used for unmanned aerial vehicle 300 may also depend on different parameters other than whether group of tress 500 are pruned or unpruned. For example, the selection of unmanned aerial vehicle 300 may depend on size of payload, distance between rows of trees, desired time of flight, desired range of flight, or some other suitable parameter.

In these illustrative examples, row 502 and row 504 of group of trees 500 may be planted distance 509 apart. Distance 509 may be about nine feet in these illustrative examples. Of course, row 502 and row 504 of group of trees 500 may be planted eight feet apart, ten feet apart, fifteen feet apart, or some other suitable distance depending on the particular implementation. The rotorcraft selected for unmanned aerial vehicle 300 is selected such that the rotorcraft may navigate through obstacles such as branches in group of trees 500 within the nine feet between row 502 and row 504 in this example.

As depicted, rotorcraft 506 is larger than rotorcraft 508 and rotorcraft 510. Rotorcraft 506 may have width 511. Width 511 may be about 5.7 feet in this example. Width 511 is a vehicle width as measured between fully extended rotors of rotorcraft 506. Rotorcraft 506 may have an average payload of up to about 800 grams. Rotorcraft 506 may have a range of about 88 minutes of flight or about 49 miles of flight in these illustrative examples.

Rotorcraft 508 is larger than rotorcraft 510. In this illustrative example, rotorcraft 508 may have width 515 and may have an average payload of about 1000 grams to about 2000 grams. Width 515 may be about 3.7 feet in this example. Width 515 is a vehicle width as measured between fully extended rotors of rotorcraft 508. Rotorcraft 508 may have a range of about 17 minutes to about 25 minutes of flight or about 9 miles to about 15 miles of flight in these illustrative examples.

As depicted, rotorcraft 506 is the smallest rotorcraft shown in this illustrative example. Rotorcraft 506 may have width 517 and may have an average payload of about 200-300 grams. Width 517 may be about 2.6 feet in this example. Width 517 is a vehicle width as measured between fully extended rotors of rotorcraft 510. Rotorcraft 506 may have a range of about minutes 25 to about 30 minutes of flight or about 9 miles to about 14 miles of flight in these illustrative examples.

Row 502 of group of trees 500 may have branches 513 extending to line 505. Line 505 may be distance 518 from row 502. Distance 518 may be about two feet in these illustrative examples. Similarly, row 504 may have branches 512 extending to line 507. Line 507 may be distance 514 from row 504. Distance 514 may also be about two feet in these illustrative examples.

Desired operation of unmanned aerial vehicle 300 may need a buffer between branches 513 and unmanned aerial vehicle 300. This buffer may be distance 520 from the end of branches 513. Distance 520 may be about one foot in these illustrative examples. Similarly, desired operation of unmanned aerial vehicle 300 may need a buffer between branches 512 and unmanned aerial vehicle 300. This buffer may be distance 516.

In one illustrative example, distance 516 may also be about one foot in these illustrative examples. Of course, distance 516 and distance 520 may be smaller or larger, depending on the particular implementation.

In this particular example, with branches 513, branches 512 and the buffers between branches 513 and branches 512 and unmanned aerial vehicle 300, route 522 may be a desired route for unmanned aerial vehicle 300. This route may have width 524. In one illustrative example, width 524 may be about three feet in these illustrative examples. Of course, depending on the desired parameters, the presence of branches 513 and branches 512, and the length of branches 513 and branches 512, route 522 may be smaller or larger in some illustrative examples.

Further, in other illustrative examples, group of trees 500 may not be configured to have evenly spaced trees or rows. In this case, rotorcraft 506 may fly a dynamic route that attempts to maintain a minimum distance from trees and tree branches.

As depicted, with route 522 at three feet, rotorcraft 506 and rotorcraft 508 may be too large to operate as desired when flying between row 502 and row 504 in group of trees 500. In this example, rotorcraft 510 may be the desired size for unmanned aerial vehicle 300.

In other illustrative examples, branches 513 and branches 512 may not be present. In this case, other sizes of rotorcraft may be used to navigate group of trees 500, depending on the functionality involved.

In still other illustrative examples, a desired value for distance 520 and distance 516 for the buffers between branches 513 and branches 512, respectively, may be less than one foot. In this case, rotorcraft 508 may be desired for unmanned aerial vehicle 300.

Figure 6:
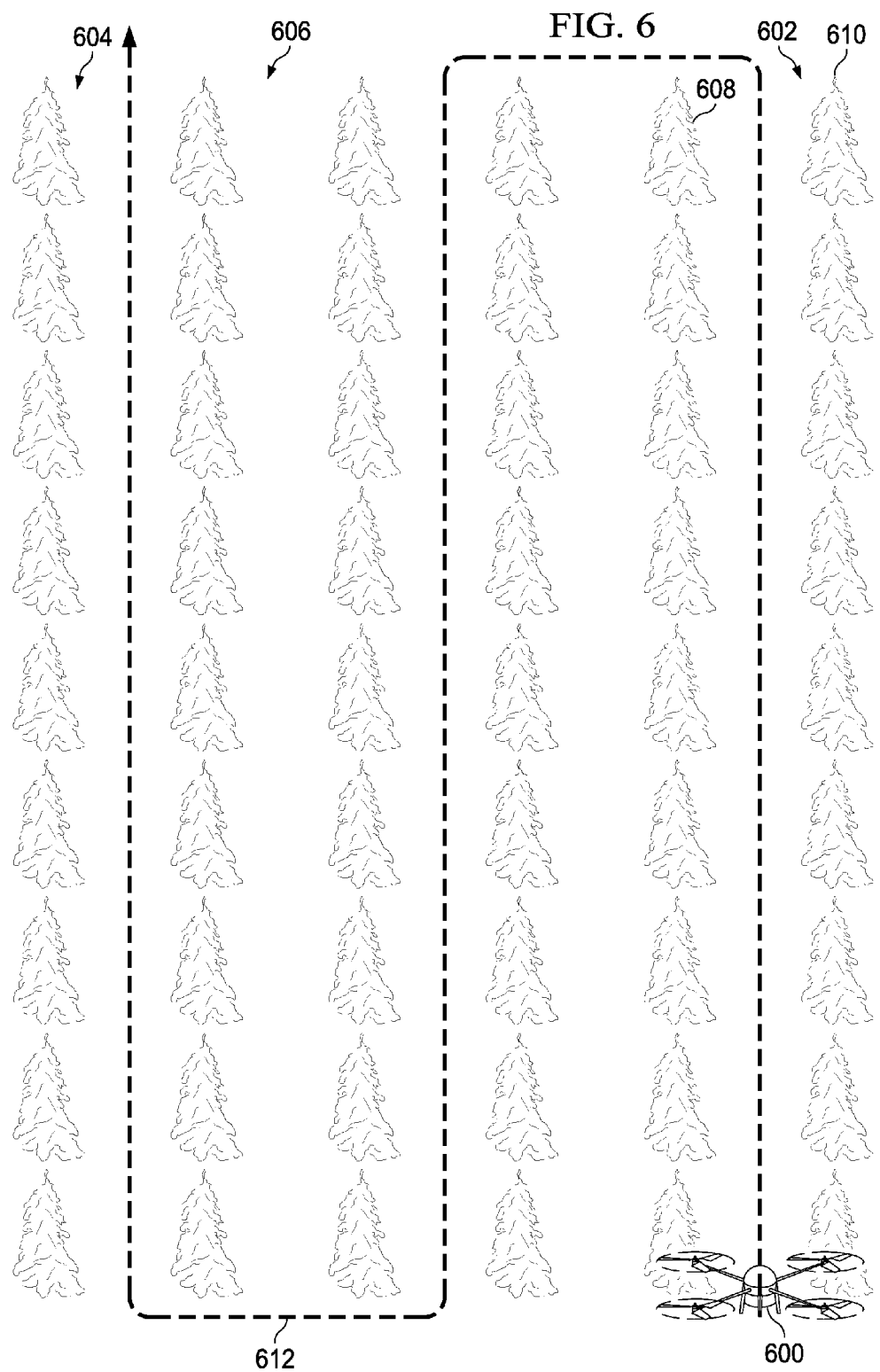
FIG. 6 is an illustration of an unmanned aerial vehicle generating tree measurement information in accordance with an illustrative embodiment.

Turning now to FIG. 6, an illustration of an unmanned aerial vehicle generating tree measurement information is depicted in accordance with an illustrative embodiment. In this depicted example, rotorcraft 600 is an example of an unmanned aerial vehicle that may be used to make measurements of group of trees 602. Group of trees 602 is an example of one manner in which group of trees 206 in FIG. 2 may be arranged.

Rotorcraft 600 is an example of one implementation for unmanned aerial vehicle 300 and is an implementation of an unmanned aerial vehicle in unmanned aerial vehicle fleet 218. In this example, rotorcraft 600 takes the form of a quadracopter. In this illustrative example, group of trees 602 is another example of an implementation of group of trees 206 shown in block form in FIG. 2.

As depicted, group of trees 602 are arranged in rows 604 and columns 606. This arrangement of group of trees 602 may be found in an environment such as a tree farm, such as a pine tree plantation.

In this illustrative example, rotorcraft 600 is configured to fly between columns 606 and generate measurements of trees. As depicted, rotorcraft 600 is configured to generate tree information for two columns of trees as rotorcraft 600 flies between the columns. In this example, rotorcraft 600 flies between column 608 and column 610 of group of trees 602. Rotorcraft 600 is configured to generate tree measurement information while flying between these two columns.

In this illustrative example, rotorcraft 600 is configured to follow route 612 through group of trees 602 to make measurements of group of trees 602. Route 612 may be generated by measurement controller 216 in FIG. 2.

In this illustrative example, rotorcraft 600 may roughly follow route 612. In other words, rotorcraft 600 may adjust its trajectory to vary from route 612. This variance may be made for a number of different reasons.

For example, the variance from route 612 may be made to avoid obstacles. In other illustrative examples, the variance from route 612 may be made to maintain rotorcraft 600 centered between columns of trees such as column 608 and column 610. For example, trees within column 608 may not be spaced exactly the same from trees in column 610 throughout those two columns. As a result, rotorcraft 600 may adjust its trajectory while substantially maintaining flight along route 612.

The illustration of the routing of rotorcraft 600 through group of trees 602 in FIG. 6 is not meant to limit the manner in which different illustrative embodiments may be implemented. For example, group of trees 602 may not be arranged in rows and columns as depicted in FIG. 6. Instead, a more random distribution may be present such as group of trees 104 as shown in tree metrology environment 100 in FIG. 1.

In still other illustrative examples, one or more additional rotorcraft in addition to rotorcraft 600 may be used to generate tree measurement information for group of trees 602.

Figure 7:
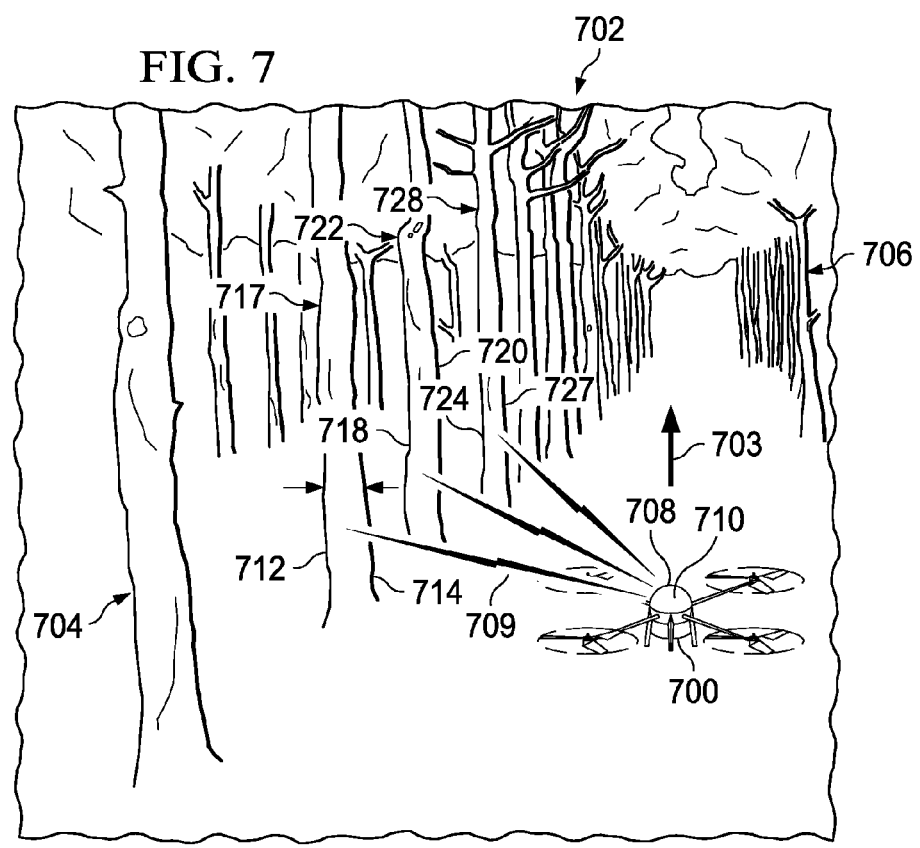
FIG. 7 is an illustration of an unmanned aerial vehicle making measurements in accordance with an illustrative embodiment.

Turning now to FIG. 7, an illustration of a rotorcraft making measurements is depicted in accordance with an illustrative embodiment. Rotorcraft 700 is an example of an implementation for unmanned aerial vehicle 300 in FIG. 3 and of an unmanned aerial vehicle in unmanned aerial vehicles 224 in FIG. 2.

In this depicted example, rotorcraft 700 travels through group of trees 702 with trajectory 703. In particular, rotorcraft 700 flies between column 704 and column 706 of group of trees 702.

In this illustrative example, rotorcraft 700 includes light detection and ranging system 708. Light detection and ranging system 708 may sweep laser beam 709 to generate measurements of distances from rotorcraft 700 to trees within column 704 and column 706 in group of trees 702.

Additionally, in some illustrative examples, rotorcraft 700 also may include camera 710. Camera 710 may be a visible light camera that generates images of group of trees 702.

In this manner, the images of the trees may be processed to identify tree edges. Tree edges identified in the image may include, for example, edge 712 and edge 714 of tree 717, edge 718 and edge 720 of tree 722, and edge 724 and edge 727 of tree 728.

In these illustrative examples, the distance between two edges may be identified by counting the number of pixels between edges in the image. The value for the number of pixels counted between edges in the images may be a pixel width. Pixel width between two edges of an object in an image can be transformed to a true width given knowledge of the distance to the object from the camera that took the image at the time the camera system took the image. In these illustrative examples, the true width is the actual width of the tree in group of trees 702.

Distance measurements to trees made by the light detection and ranging system are used to make the adjustment from pixel width between edges in the image to true width of the tree in group of trees 702. To make this transformation between pixel width and true width, camera 710 may be calibrated using a calibration matrix that is known. In this manner, the diameters of tree 717, tree 722, and tree 728 may be identified. Further, the diameters of these trees for different heights of the trees may be identified from the image and the points. Using the diameter measurements made at different heights, taper of the trees may be identified.

Further, as rotorcraft 700 moves through group of trees 702, rotorcraft 700 may take multiple images of a given tree from different perspectives. By applying the same technique of edge detection, distance measurement, and width transformation, the various estimates of diameter and taper can be improved. To improve a diameter measurement, for example, the measurements by the different images are averaged. In this manner, diameter and taper measurements may have a desired level of accuracy. In particular, this desired level of accuracy may be substantially similar to the level of accuracy enabled by much larger and heavier high frequency light detection and ranging scanners that are too heavy to fit on a small unmanned aerial vehicle such as rotorcraft 700.

In still other illustrative examples, rotorcraft 700 may only include a stereographic camera and may not need a light detection and ranging system. The stereographic camera may generate information from different perspectives that allow for an identification of depth and distances between different points on the trees from the images.

The illustration of rotorcraft 700 scanning group of trees 702 in FIG. 7 is not meant to imply limitations to the manner in which information may be generated from group of trees 702. For example, in other illustrative examples, rotorcraft 700 may make more than one pass between column 704 and column 706 of group of trees 702. Multiple passes may be made to generate more information or more accurate information about trees in group of trees 702.

Figure 8:
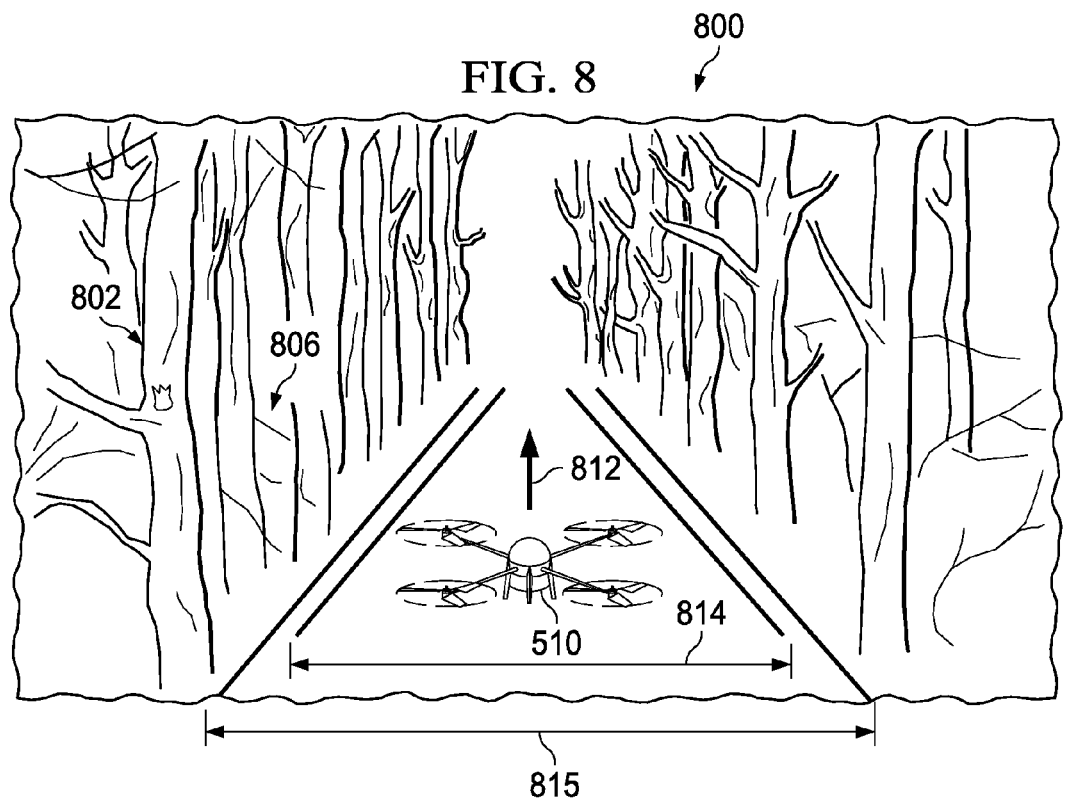
FIG. 8 is an illustration of an unmanned aerial vehicle flying between rows of trees in accordance with an illustrative embodiment.

Turning now to FIG. 8, an illustration of an unmanned aerial vehicle flying between rows of trees is depicted in accordance with an illustrative embodiment. In this illustrative example, group of trees 800 is another example of an implementation of group of trees 206 shown in block form in FIG. 2.

Group of trees 800 has row 802 and row 804. This arrangement of group of trees 800 may be found in an environment such as a tree farm. Specifically, row 802 and row 804 may be part of a pine tree plantation in these illustrative examples.

Group of trees 800 in row 802 and row 804 may be unpruned trees. Row 802 may have branches 806 and row 804 may have branches 808. Branches 806 and branches 808 may extend about two feet from row 802 and row 804, respectively, in these illustrative examples.

As depicted, rotorcraft 510 from FIG. 5 is shown between row 802 and row 804 in group of trees 800. Rotorcraft 510 may fly in the direction of arrow 812 between row 802 and row 804 to take measurements of group of trees 800. The direction may be an example of a route that takes the form of a vector in a simple form.

Rotorcraft 510 may fly between branches 806 and branches 808. In this example, rotorcraft 510 may have a route that has width 814. Width 814 is the distance between branches 806 and branches 808 in these illustrative examples.

In other illustrative examples, row 802 and row 804 may be pruned trees. In this case, rotorcraft 510 may have more space to navigate around obstacles in group of trees 800. For example, rotorcraft 510 may have a route that has width 815 when group of trees 800 are pruned trees. In this case, width 815 is the distance between tree trunks in row 802 and tree trunks in row 804.

Figure 9:
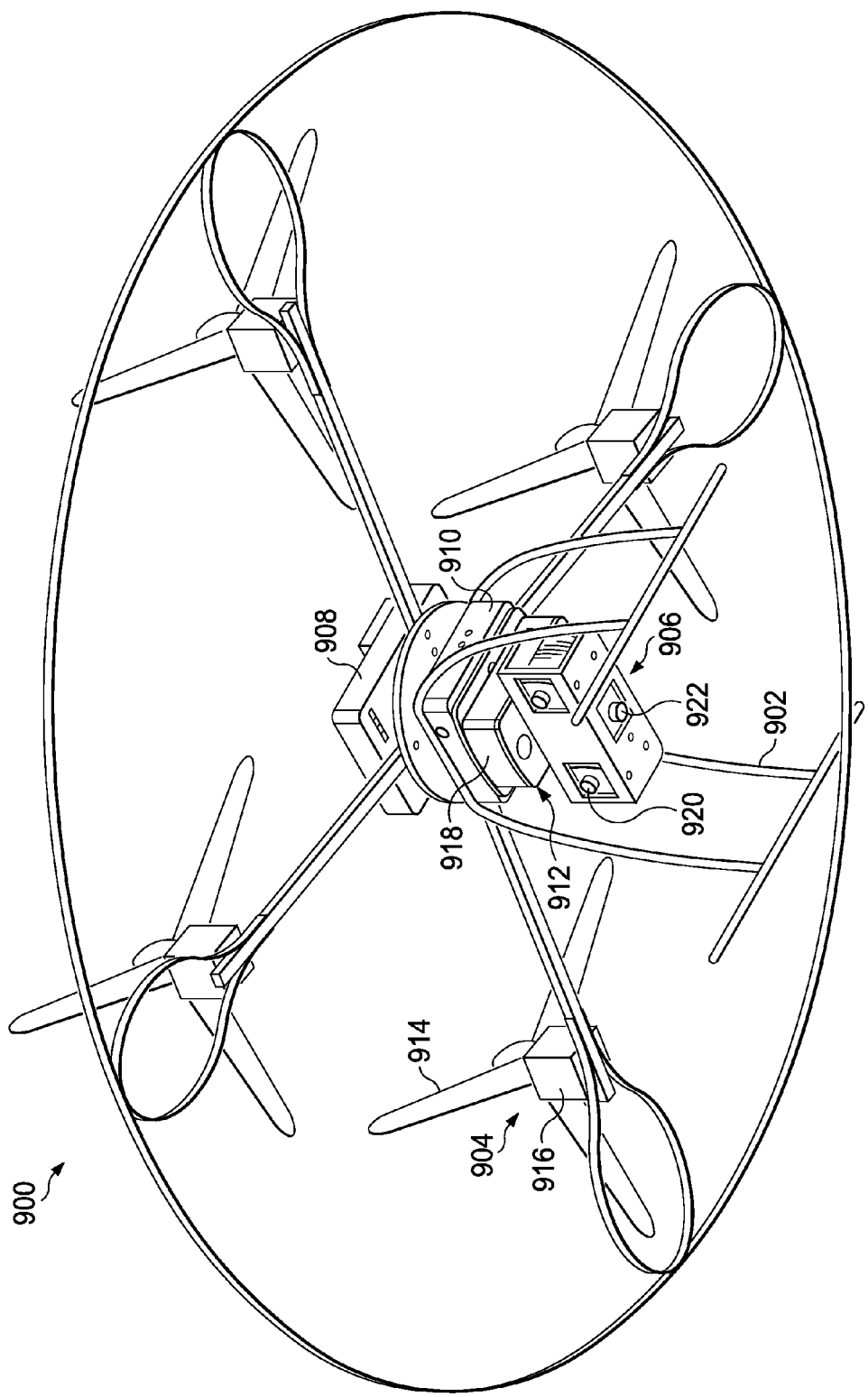
FIG. 9 is an illustration of an unmanned aerial vehicle in accordance with an illustrative embodiment.

With reference now to FIG. 9, an illustration of an unmanned aerial vehicle is depicted in accordance with an illustrative embodiment. In this illustrative example, rotorcraft 900 is an example of one implementation for unmanned aerial vehicle 300 shown in block form in FIG. 3. Further, rotorcraft 900 may be an example of rotorcraft 510 in FIG. 5.

As depicted, rotorcraft 900 may have airframe 902, propulsion system 904, sensor system 906, communications system 908, controller 910, and power source 912. Airframe 902 provides a structure for physical support of the other components in rotorcraft 900.

Propulsion system 904 is associated with airframe 902 and is configured to provide movement for rotorcraft 900. In this illustrative example, propulsion system 904 may be propellers 914. Propellers 914 may be about ten inches in length in this example. Of course, propellers 914 may be longer or shorter than ten inches, depending on the particular implementation.

As depicted, propulsion system 904 with propellers 914 are motors 916. Motors 916 may be brushless motors in these illustrative examples. In this illustrative example, brushless motors are synchronous motors powered by a direct current electric source.

In these illustrative examples, sensor system 906 is a system associated with airframe 902. Sensor system 906 is configured to generate information about the environment around rotorcraft 900.

Sensor system 906 may include one or more different types of sensors configured to generate information about the environment around rotorcraft 900. For example, sensor system 906 may generate obstacle information such as obstacle information 332 in FIG. 3 and tree measurement information such as tree measurement information 204 in FIG. 2.

As depicted, sensor system 906 may have camera 920 and camera 922. Camera 920 may be a stereographic camera and camera 922 may be a visible light camera in these illustrative examples. Camera 920 and camera 922 may be examples of implementations for stereographic camera 426 and visible light camera 424 in FIG. 4, respectively. Sensor system 906 also includes a light-based active sensor system and may optionally include a global positioning system receiver (not shown) in this example.

Communications system 908 is associated with airframe 902. As depicted, communications system 908 is configured to provide communications between rotorcraft 900 and another device. The communications may be wireless communications in these illustrative examples.

Controller 910 is associated with airframe 902. Controller 910 may control operation of other components in rotorcraft 900. Controller 910 may have a desired level of intelligence to aid in operation of rotorcraft 900.

Controller 910 may have a processor unit and an autopilot feature in these illustrative examples. Controller 910 may receive commands, tasks, or other types of information depending on the level of intelligence for controller 910. Further, controller 910 may operate rotorcraft 900 using some type of navigation software in some illustrative examples.

Power source 912 is associated with airframe 902. Power source 912 is configured to provide power for the other components in rotorcraft 900. Power source 912 may be battery 918. Battery 918 may be selected from one of a lithium polymer battery, a fuel cell, a lithium-air battery, a zinc-air battery, or some other suitable type of battery.

Battery 918 may also be swappable to enable persistent flight of rotorcraft 900. When battery 918 is swappable, at least one other battery may be put in the place of battery 918 while rotorcraft 900 is using power.

Rotorcraft 900 may travel along a route between a group of trees to collect information about the group of trees. Tree measurement information 204 in FIG. 2 may include information such as type of trees, height of trees, and other suitable types of information.

The different components shown in FIG. 1 and FIGS. 5-10 may be combined with components in FIGS. 2-4, used with components in FIGS. 2-4, or a combination of the two. Additionally, some of the components in FIG. 1 and FIGS. 5-10 may be illustrative examples of how components shown in block form in FIGS. 2-4 can be implemented as physical structures.

Figure 10:
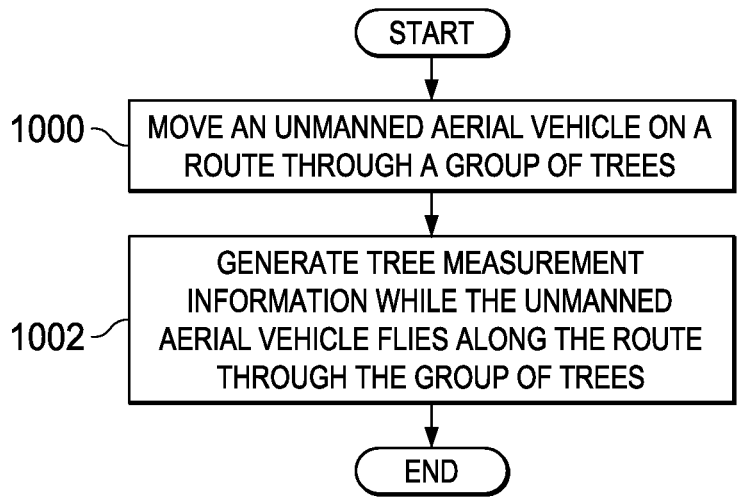
FIG. 10 is an illustration of a flowchart of a process for generating tree measurement information in accordance with an illustrative embodiment.

Turning now to FIG. 10, an illustration of a flowchart of a process for generating tree measurement information is depicted in accordance with an illustrative embodiment. The process illustrated in FIG. 10 may be implemented using tree metrology system 202 in FIG. 2.

The process begins by moving an unmanned aerial vehicle on a route through a group of trees (operation 1000). In operation 1000, the route may have a height that is configured to allow measurements to be made for identifying a number of diameters of the group of trees by a sensor system associated with the unmanned aerial vehicle.

In these illustrative examples, the route may take various forms. For example, the route may have turns and changes to move the unmanned aerial vehicle in a manner such that tree measurement information may be generated for all of the trees in the group of trees. In some illustrative examples, the route may be just a trajectory in a direction between columns of trees in the group of trees.

Tree measurement information is generated while the unmanned aerial vehicle flies along the route through the group of trees (operation 1002) with the process terminating thereafter. In this illustrative example, the measurement information may be information used to generate measurements for a parameter, such as diameters of trees. In other illustrative examples, the trees measurement information may actually be the diameters of the trees.

Figure 11:
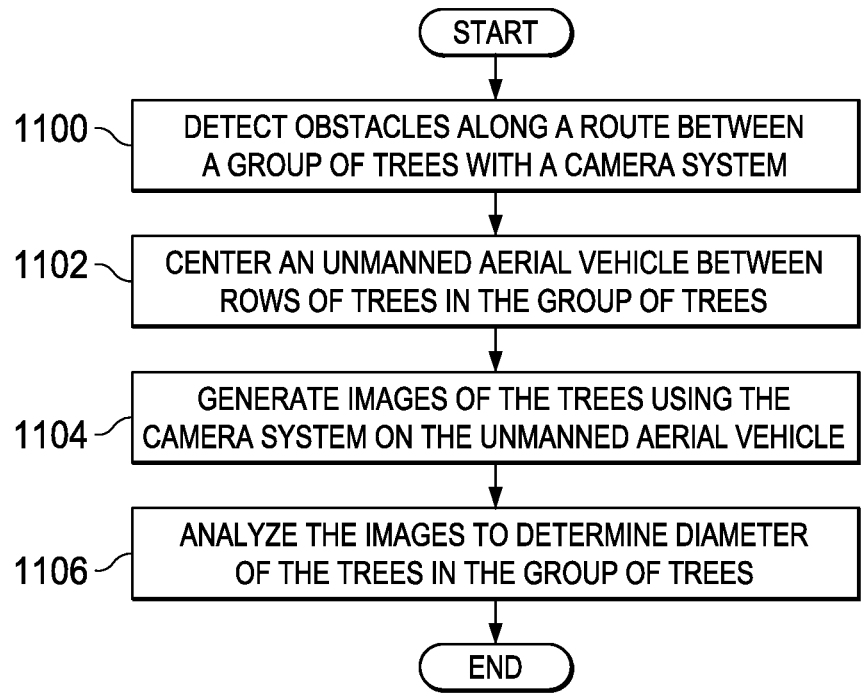
FIG. 11 is an illustration of a flowchart of a process for analyzing images to determine diameters in accordance with an illustrative embodiment.

With reference to FIG. 11, an illustration of a flowchart of a process for analyzing images to determine diameter is depicted in accordance with an illustrative embodiment. The process illustrated in FIG. 11 may be implemented using tree metrology system 202 in FIG. 2. The process illustrated in FIG. 11 may also be implemented to identify tree taper and other types of tree measurement information 204 using tree metrology system 202.

The process begins by detecting, with a camera system, obstacles along a route between a group of trees (operation 1100). The camera system may be a resolution digital camera in these illustrative examples. Further, the camera system may be selected based on weight, quality of images generated, or both weight and quality of images generated. The camera system may be located on an unmanned aerial vehicle such as rotorcraft 900 in FIG. 9.

Next, the process centers the unmanned aerial vehicle between rows of trees in the group of trees (operation 1102). In operation 1102, the unmanned aerial vehicle may be centered using a light detection and ranging system and a controller. The light detection and ranging system may measure the distance to adjacent trees in each row of trees. A controller on the unmanned aerial vehicle may calculate the distance of the unmanned aerial vehicle relative to the rows of trees using these measurements and make corrections to center the unmanned aerial vehicle between the rows. The unmanned aerial vehicle may have a desired buffer on each side of the unmanned aerial vehicle between the unmanned aerial vehicle and trees, branches, or some combination thereof.

Images of the trees are generated using the camera system on the unmanned aerial vehicle (operation 1104). The process then analyzes the images to determine the diameter of the trees in the group of trees (operation 1106) with the process terminating thereafter. The diameter may be identified for various heights on a tree in the group of trees. In some cases, additional information such as the diameter of branches, tree taper, tree forks, or other types of tree measurement information may be identified, depending on the particular implementation.

Figure 12:
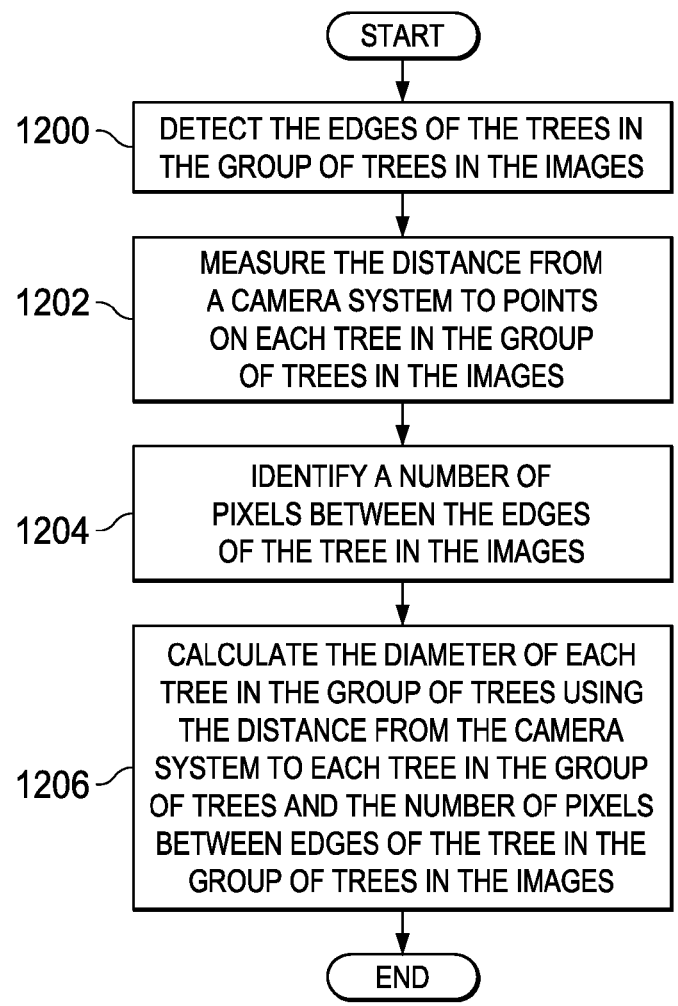
FIG. 12 is an illustration of a flowchart of a process for determining a diameter of a tree in accordance with an illustrative embodiment.

Turning now to FIG. 12, an illustration of a flowchart of a process for determining a diameter of a tree is depicted in accordance with an illustrative embodiment. The process illustrated in FIG. 12 may be implemented using tree metrology system 202 in FIG. 2 in operation 1106 in FIG. 11.

The process begins by detecting the edges of the trees in the group of trees in the images (operation 1200). In operation 1200, edge detection software may be used to detect the edge of the trees in the images generated by the camera system.

Next, the process measures the distance from the camera to points on each tree in the group of trees in the images (operation 1202). This distance may be determined by the parameters of the rotorcraft selected for unmanned aerial vehicle 300. In operation 1202, an ultra-light weight, low power sensor may be used to determine the distance from the camera on the unmanned aerial vehicle and the tree. This sensor may be a light detection and ranging scanner that scans the distance along a single plane.

The process identifies the pixels between the edges of the tree in the group of trees in the image (operation 1204). The process then calculates the diameter of each tree in the group of trees using the distance from the camera to each tree in the group of trees and the number of pixels between edges of each tree in the group of trees in the image (operation 1206) with the process terminating thereafter. This calculation may be a nonlinear function that translates pixel width to true width based on distance. The diameter of the trees may also be calculated using conversion tables that show the conversion between pixel width and true width as a function of distance to an object.

Thus, the diameter of the tree may be determined by knowing both distance and the camera properties of the unmanned aerial vehicle. For example, a camera calibration matrix is a fixed property of the camera which can be determined through calibration. The camera matrix is dependent on properties of the camera lens and optical sensor and describes how three-dimensional points may be transformed to two-dimensional points in an image. The camera calibration matrix may be different for each type of camera or camera lens used in a camera system.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 13:
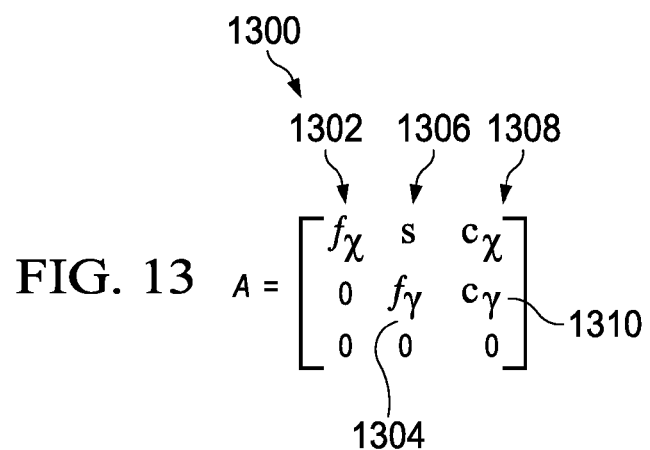
FIG. 13 is an illustration of a camera calibration matrix in accordance with an illustrative embodiment.

With reference now to FIG. 13, an illustration of a camera calibration matrix is depicted in accordance with an illustrative embodiment. Camera calibration matrix 1300 shown in this figure may be used in the process shown in FIG. 12 to calculate tree measurements.

Camera calibration matrix 1300 is used to identify actual distances between features in an image based on the number of pixels between the features. The features may be, for example, edges of a tree. By knowing the distance between edges of a tree, the diameter of the tree can be calculated using camera calibration matrix 1300.

In this illustrative example, camera calibration matrix 1300 is a fixed property of the camera which can be determined through calibration. Camera calibration matrix 1300 is dependent on the lens properties and optical sensor properties of the camera and describes how three-dimensional points in the world transform to two-dimensional points in an image. These lens properties may be focal lengths in this illustrative example.

Camera calibration matrix 1300 may include focal length 1302 and focal length 1304. Focal length 1302 and focal length 1304 may be measured in pixels and describe the level of strength that the camera optics converge or diverge light in each axes of the image to bring beams to focus.

Factor 1306 is a factor accounting for the skew of the optics between the images in two axes and describes the manner in which rays of light may be rotated by the camera optics. The constants captured in camera calibration matrix 1300 are intrinsic to the camera such that they do not change.

Value 1308 and value 1310 may also be used as input in camera calibration matrix 1300. As depicted, value 1308 and value 1310 define the principal point of the camera. This principle point may be a center point in the image in these illustrative examples. In other illustrative examples, the principal point may not be the center point of the image. The principal point may be defined as the intersection of the optical axis and the image plane.

Camera calibration matrix 1300 may be generated by using images of a test object taken by the camera at different predefined distances from the object. The test object may be, for example, a cube having known dimensions. Pixels in the images may be matched with the known distances between features, such as edges of the cube, to identify information for generating camera calibration matrix 1300.

Figure 14:
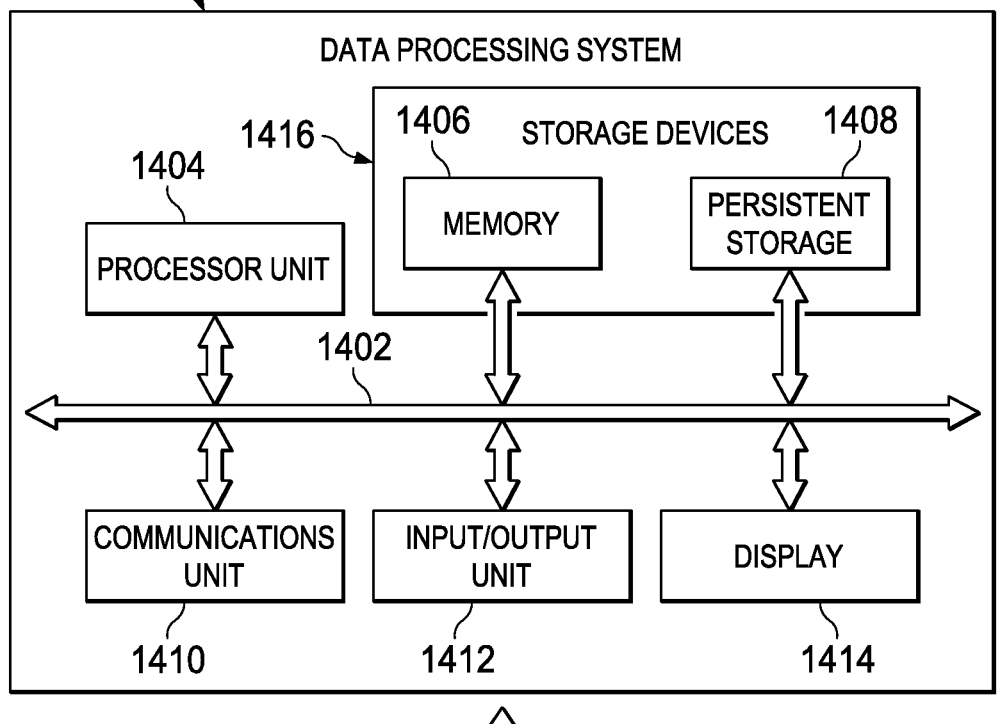
FIG. 14 is an illustration of a block diagram of a data processing system in accordance with an illustrative embodiment.

Turning now to FIG. 14, an illustration of a block diagram of a data processing system is depicted in accordance with an illustrative embodiment. Data processing system 1400 may be one implementation for computer system 220 in FIG. 2. In this illustrative example, data processing system 1400 includes communications fabric 1402, which provides communications between processor unit 1404, memory 1406, persistent storage 1408, communications unit 1410, input/output unit 1412, and display 1414.

Processor unit 1404 serves to execute instructions for software that may be loaded into memory 1406. Processor unit 1404 may be a number of processors, a multi-processor core, or some other type of processor, depending on the particular implementation. A number, as used herein with reference to an item, means one or more items. Further, processor unit 1404 may be implemented using a number of heterogeneous processor systems in which a main processor is present with secondary processors on a single chip. As another illustrative example, processor unit 1404 may be a symmetric multi-processor system containing multiple processors of the same type.

Memory 1406 and persistent storage 1408 are examples of storage devices 1416. A storage device is any piece of hardware that is capable of storing information, such as, for example, without limitation, data, program code in functional form, and/or other suitable information either on a temporary basis and/or a permanent basis. Storage devices 1416 may also be referred to as computer readable storage devices in these examples. Memory 1406, in these examples may be, for example, a random access memory or any other suitable volatile or non-volatile storage device. Persistent storage 1408 may take various forms, depending on the particular implementation.

For example, persistent storage 1408 may contain one or more components or devices. For example, persistent storage 1408 may be a hard drive, a flash memory, a rewritable optical disk, a rewritable magnetic tape, or some combination of the above. The media used by persistent storage 1408 also may be removable. For example, a removable hard drive may be used for persistent storage 1408.

Communications unit 1410, in these examples, provides for communications with other data processing systems or devices. In these examples, communications unit 1410 is a network interface card. Communications unit 1410 may provide communications through the use of either or both physical and wireless communications links.

Input/output unit 1412 allows for input and output of data with other devices that may be connected to data processing system 1400. For example, input/output unit 1412 may provide a connection for user input through a keyboard, a mouse, and/or some other suitable input device. Further, input/output unit 1412 may send output to a printer. Display 1414 provides a mechanism to display information to a user.

Instructions for the operating system, applications, and/or programs may be located in storage devices 1416, which are in communication with processor unit 1404 through communications fabric 1402. In these illustrative examples, the instructions are in a functional form on persistent storage 1408. These instructions may be loaded into memory 1406 for execution by processor unit 1404. The processes of the different embodiments may be performed by processor unit 1404 using computer implemented instructions, which may be located in a memory, such as memory 1406.

These instructions are referred to as program code, computer usable program code, or computer readable program code that may be read and executed by a processor in processor unit 1404. The program code in the different embodiments may be embodied on different physical or computer readable storage media, such as memory 1406 or persistent storage 1408.

Program code 1418 is located in a functional form on computer readable media 1420 that is selectively removable and may be loaded onto or transferred to data processing system 1400 for execution by processor unit 1404. Program code 1418 and computer readable media 1420 form computer program product 1422 in these examples. In one example, computer readable media 1420 may be computer readable storage media 1424 or computer readable signal media 1426. Computer readable storage media 1424 may include, for example, an optical or magnetic disk that is inserted or placed into a drive or other device that is part of persistent storage 1408 for transfer onto a storage device, such as a hard drive, that is part of persistent storage 1408. Computer readable storage media 1424 also may take the form of a persistent storage, such as a hard drive, a thumb drive, or a flash memory, that is connected to data processing system 1400. In some instances, computer readable storage media 1424 may not be removable from data processing system 1400. In these illustrative examples, computer readable storage media 1424 is a non-transitory computer readable storage medium.

Alternatively, program code 1418 may be transferred to data processing system 1400 using computer readable signal media 1426. Computer readable signal media 1426 may be, for example, a propagated data signal containing program code 1418. For example, computer readable signal media 1426 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1418 may be downloaded over a network to persistent storage 1408 from another device or data processing system through computer readable signal media 1426 for use within data processing system 1400. For instance, program code stored in a computer readable storage medium in a server data processing system may be downloaded over a network from the server to data processing system 1400. The data processing system providing program code 1418 may be a server computer, a client computer, or some other device capable of storing and transmitting program code 1418.

The different components illustrated for data processing system 1400 are not meant to provide architectural limitations to the manner in which different embodiments may be implemented. The different illustrative embodiments may be implemented in a data processing system including components in addition to or in place of those illustrated for data processing system 1400. Other components shown in FIG. 14 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

As another example, a storage device in data processing system 1400 is any hardware apparatus that may store data. Memory 1406, persistent storage 1408, and computer readable media 1420 are examples of storage devices in a tangible form.

In another example, a bus system may be used to implement communications fabric 1402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 1406, or a cache, such as found in an interface and memory controller hub that may be present in communications fabric 1402.

Thus, the illustrative embodiments provide a method and apparatus for identifying a number of diameters for a group of trees. With the use of an illustrative embodiment, an unmanned aerial vehicle moves on a route through the group of trees at a height that is configured to allow measurement of the number of diameters for the group of trees.

The use of an unmanned aerial vehicle flying between rows of trees in the group of trees generates information about a number of diameters for the group of trees more quickly and cost-effectively than with currently used methodologies such as manual sampling. Further, since an unmanned aerial vehicle can fly through the entire forest and measure each diameter of each tree more quickly and easily, more accurate information is generated for forest managers. This information may be used by forest managers to make decisions about forest operations more quickly and easily than with other measurement methods.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
    an unmanned aerial vehicle;
    a sensor system associated with the unmanned aerial vehicle, wherein the sensor system is configured to generate obstacle information and tree measurement information; and
    a controller configured to:
        identify obstacles from the obstacle information generated by the sensor system as the unmanned aerial vehicle flies through a group of trees,
        generate the tree measurement information for the group of trees, and
        control movement of the unmanned aerial vehicle to avoid the obstacles.

2. The apparatus of claim 1, wherein the controller is configured to control movement of the unmanned aerial vehicle through the group of trees avoiding the obstacles while generating the tree measurement information for the group of trees.

3. The apparatus of claim 1, wherein the tree measurement information is diameter information for the group of trees and the controller is configured to control movement of the unmanned aerial vehicle along a trajectory that is located between trees in the group of trees while generating the diameter information for the group of trees.

4. The apparatus of claim 1, further comprising:
a measurement controller configured to receive the tree measurement information and analyze the tree measurement information;
wherein a route is configured to allow for measurement of the group of trees to generate the tree measurement information;
wherein the tree measurement information is selected from at least one of diameter information, taper information, tree density, tree type, and tree spacing;
wherein the sensor system comprises at least one of a light-based active sensor system, a light detection and ranging system, a camera system, a laser altimeter, a time-of-flight camera system, an all-focus image camera, and a stereographic camera;
wherein the unmanned aerial vehicle is selected from one of a fixed wing unmanned aerial vehicle and an unmanned rotorcraft; and
wherein the group of trees is located in a location selected from one of a tree farm, a pine tree plantation, a forest, a park, and a mountain.

5. The apparatus of claim 1, wherein the sensor system comprises a light detection and ranging system and a camera system.

6. The apparatus of claim 5, wherein the light detection and ranging system is configured to generate distances to points on the group of trees, the camera system is configured to generate images of the obstacles, and the controller is configured to generate the tree measurement information using the light detection and ranging system.

7. The apparatus of claim 5,
wherein the controller is configured to:
correlate images from the camera system of the sensor system with distance information from the light detection and ranging system, and
determine whether the unmanned aerial vehicle fits between obstacles that include trees of the group of trees.

8. The apparatus of claim 6, wherein the controller is configured to generate a route through the obstacles using the images and distance information for the obstacles and generate diameters from the tree measurement information.

9. The apparatus of claim 6, wherein the controller is configured to use the images generated by the camera system to generate the obstacle information and the tree measurement information.

10. The apparatus of claim 6,
wherein the controller is configured to use the distances generated by the light detection and ranging system to generate the obstacle information and the tree measurement information.

11. The apparatus of claim 1,
wherein the controller is configured to:
calculate a distance of the unmanned aerial vehicle relative to rows of trees in the group of trees and make corrections to center the unmanned aerial vehicle between the rows.

12. The apparatus of claim 1,
wherein the unmanned aerial vehicle is one of a swarm of unmanned aerial vehicles;
wherein the controller is configured to:
direct the unmanned aerial vehicle to an area of the group of trees with a least amount of space between trees when the unmanned aerial vehicle is a smallest unmanned aerial vehicle in the swarm, and
direct the unmanned aerial vehicle to another area of the group of trees when the unmanned aerial vehicle is a larger unmanned aerial vehicle in the swarm.

13. A tree metrology system comprising:
an unmanned aerial vehicle;
a camera system associated with the unmanned aerial vehicle, wherein the camera system is configured to generate images;
a light detection and ranging system associated with the unmanned aerial vehicle, wherein the light detection and ranging system is configured to generate distance measurements from the unmanned aerial vehicle to points on a group of trees; and
a controller configured to:
identify obstacles from the images generated by the camera system as the unmanned aerial vehicle flies through the group of trees,
generate diameter information for the group of trees from the images and the distance measurements, and
control movement of the unmanned aerial vehicle through the group of trees to avoid the obstacles while the unmanned aerial vehicle generates the diameter information.

14. The tree metrology system of claim 13 further comprising:
a measurement controller configured to receive the diameter information and analyze the diameter information.

15. A method for identifying a number of diameters for a group of trees, the method comprising:
moving an unmanned aerial vehicle on a route through the group of trees at a height that is configured to allow measurement of the number of diameters for the group of trees by a sensor system associated with the unmanned aerial vehicle; and
generating information about the number of diameters for the group of trees and obstacle information using the sensor system associated with the unmanned aerial vehicle.

16. The method of claim 15, wherein the generating step comprises:
generating a number of images of the group of trees using a camera system in the sensor system; and
measuring distances to points on the group of trees using a light-based active sensor system in the sensor system, wherein the number of images and the distances form the information about the number of diameters.

17. The method of claim 16 further comprising:
identifying a number of pixels between edges of each tree in the group of trees in an image; and
calculating a diameter of each tree in the group of trees using a distance from the camera system to the each tree in the group of trees and the number of pixels between the edges of the each tree in the group of trees in the image.

18. The method of claim 16 further comprising:
generating a route through obstacles in the group of trees using the number of images and the distances.

19. The method of claim 15, wherein the unmanned aerial vehicle is part of a group of unmanned aerial vehicles and further comprising:
  operating the group of unmanned aerial vehicles in a swarm such that the group of unmanned aerial vehicles generates the information about the number of diameters for the group of trees using a plurality of sensor systems associated with the group of unmanned aerial vehicles.

20. The method of claim 15 further comprising:
  receiving the number of diameters; and
  analyzing the number of diameters using a measurement controller.

* * * * *